(12) United States Patent
Matsunaga

(10) Patent No.: US 11,511,738 B2
(45) Date of Patent: Nov. 29, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 17/016,420

(22) Filed: Sep. 10, 2020

(65) Prior Publication Data

US 2021/0086767 A1 Mar. 25, 2021

(30) Foreign Application Priority Data

Sep. 25, 2019 (JP) .............................. JP2019-174209

(51) Int. Cl.
*B60W 30/095* (2012.01)
*B60W 10/04* (2006.01)
(Continued)

(52) U.S. Cl.
CPC ........ *B60W 30/0956* (2013.01); *B60W 10/04* (2013.01); *B60W 10/20* (2013.01);
(Continued)

(58) Field of Classification Search
CPC .. B60W 30/0956; B60W 10/04; B60W 10/20; B60W 30/143; B60W 30/18018;
(Continued)

(56) References Cited

U.S. PATENT DOCUMENTS

| 2013/0135118 A1* | 5/2013 | Ricci | B60W 50/0098 |
| | | | 340/932.2 |
| 2013/0218433 A1* | 8/2013 | Matsuno | B60W 30/0956 |
| | | | 701/70 |

(Continued)

FOREIGN PATENT DOCUMENTS

| JP | 11-311316 | 11/1999 |
| JP | 2007-156894 | 6/2007 |

(Continued)

OTHER PUBLICATIONS

Japanese Office Action for Japanese Patent Application No. 2019-174209 dated May 10, 2022.

*Primary Examiner* — Jonathan M Dager
*Assistant Examiner* — Jean Wcharleston
(74) *Attorney, Agent, or Firm* — Amin, Turocy & Watson, LLP

(57) ABSTRACT

A vehicle control device includes a recognizer that is configured to recognize a peripheral situation of a vehicle and a driving controller that is configured to execute automated driving for controlling a speed and steering of the vehicle on the basis of a recognition result of the recognizer. The recognizer is configured to recognize a real-time environment including a situation of a nearby vehicle or a situation of a nearby road on which the vehicle travels, and the driving controller is configured to shunt the vehicle to a shunt location to suspend the automated driving in a case where the real-time environment corresponds to a predetermined condition, and resume the automated driving in a case where the predetermined condition is resolved after the shunt.

14 Claims, 19 Drawing Sheets

(51) Int. Cl.
*B60W 10/20* (2006.01)
*B60W 30/14* (2006.01)
*B60W 30/18* (2012.01)
*B60W 40/06* (2012.01)
*B60W 40/04* (2006.01)

(52) U.S. Cl.
CPC .... *B60W 30/143* (2013.01); *B60W 30/18018* (2013.01); *B60W 30/18109* (2013.01); *B60W 40/04* (2013.01); *B60W 40/06* (2013.01); *B60W 2552/20* (2020.02); *B60W 2552/35* (2020.02); *B60W 2555/60* (2020.02); *B60W 2710/20* (2013.01); *B60W 2720/10* (2013.01)

(58) Field of Classification Search
CPC ........... B60W 30/18109; B60W 40/04; B60W 40/06; B60W 2552/20; B60W 2552/35; B60W 2555/60; B60W 2710/20; B60W 2720/10; B60W 60/00184; B60W 2050/0072; B60W 2552/53; B60W 2555/20; B60W 60/0053; B60W 60/0059; B60W 60/00186; G05D 1/024; G05D 1/0214; G05D 1/0221; G05D 1/0223; G05D 1/0251; G05D 1/0257; G05D 1/028; G05D 1/0285; G05D 2201/02

USPC .......................................................... 701/36
See application file for complete search history.

(56) References Cited

U.S. PATENT DOCUMENTS

| | | | |
|---|---|---|---|
| 2017/0313321 A1* | 11/2017 | Asakura | B60W 30/18 |
| 2017/0352200 A1* | 12/2017 | Wang | H04W 4/027 |
| 2019/0049948 A1* | 2/2019 | Patel | G05D 1/0276 |
| 2019/0061745 A1* | 2/2019 | Hatano | B60W 60/0053 |
| 2019/0080609 A1* | 3/2019 | Mizoguchi | B60W 50/10 |
| 2019/0084619 A1* | 3/2019 | Mizoguchi | G05D 1/0278 |
| 2019/0143972 A1* | 5/2019 | Ishioka | G06V 20/588 |
| | | | 701/70 |
| 2020/0064839 A1* | 2/2020 | Oyama | G05D 1/0088 |
| 2020/0180660 A1* | 6/2020 | Honda | B60W 60/0054 |

FOREIGN PATENT DOCUMENTS

| | | |
|---|---|---|
| JP | 2018-101199 | 6/2018 |
| JP | 2019-018848 | 2/2019 |
| JP | 2019-038471 | 3/2019 |
| JP | 2019-156195 | 9/2019 |
| WO | 2019/026438 | 2/2019 |
| WO | 2019/082774 | 5/2019 |

* cited by examiner

192

| LINK ID | EXECUTABLE DRIVING STATE |
|---------|--------------------------|
| 001 | DRIVING STATE A |
| 002 | DRIVING STATE A |
| 003 | DRIVING STATE B |
| ⋮ | ⋮ |

FIG. 12

| ENVIRONMENTAL LEVEL | SITUATION OF ROAD | DRIVING STATE |
|---|---|---|
| ENVIRONMENTAL LEVEL 1 | --- | DRIVING STATE A |
| ENVIRONMENTAL LEVEL 2 | RECESSED PORTION OR PROTRUDING PORTION HAVING PREDETERMINED SIZE OR LESS, RAINFALL OR SNOWFALL OF ○○ OR LESS | DRIVING STATE B |
| ENVIRONMENTAL LEVEL 3 | CONSTRUCTION, STOP VEHICLE, OR RAINFALL OR SNOWFALL OF OR ×× MORE | DRIVING STATE C |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-174209, filed Sep. 25, 2019, the content of which is incorporated herein by reference.

BACKGROUND

Field

The present invention relates to a vehicle control device, a vehicle control method, and a storage medium.

Description of Related Art

In the past, a device that estimates the shape of a front road on the basis of a database, and in a case where there is a great difference between an estimation result and an actual road shape, stops traveling control based on the database the next time it travels on that road has been disclosed (Japanese Unexamined Patent Application, First Publication No. 11-311316). A driving assistance device that transmits detection data to a distribution server in a case where a maintenance point at which road data and a traveling result of a vehicle do not match each other is detected, and a distribution method of collecting the received detection data and transmitting the updated road data to the driving assistance device has been disclosed (Japanese Unexamined Patent Application, First Publication No. 2007-156894).

However, in the related art, a vehicle may not be able to be appropriately controlled in accordance with the environment of a road changing from moment to moment.

SUMMARY

The present invention was contrived in view of such circumstances, and one object thereof is to provide a vehicle control device, a vehicle control method, and a storage medium that make it possible to realize control of a vehicle according to an environment.

The following configurations are adopted in a vehicle control device, a vehicle control method, and a storage medium according to this invention.

(1) According to an aspect of this invention, there is provided a vehicle control device including: a recognizer that is configured to recognize a peripheral situation of a vehicle; and a driving controller that is configured to execute automated driving for controlling a speed and steering of the vehicle on the basis of a recognition result of the recognizer, wherein the recognizer is configured to recognize a real-time environment including a situation of a nearby vehicle or a situation of a nearby road on which the vehicle travels, and the driving controller is configured to shunt the vehicle to a shunt location to suspend the automated driving in a case where the real-time environment corresponds to a predetermined condition, and resume the automated driving in a case where the predetermined condition is resolved after the shunt.

(2) In the vehicle control device according to the aspect of the above (1), the recognizer is configured to recognize an environmental level indicating a real-time environment including a situation of a nearby vehicle or a situation of a nearby road on which the vehicle travels, and the driving controller is configured to shunt the vehicle to a shunt location to suspend the automated driving in accordance with a decrease in the environmental level, and resume the automated driving in a case where, after the shunt, the environmental level including the predetermined condition being resolved rises to an environmental level higher than the environmental level during the shunt.

(3) In the vehicle control device according to the aspect of the above (2), the environmental level decreases due to a predetermined factor, and the factor is construction being performed on a road, a vehicle urgently stopping on a road being present, an emergency vehicle approaching the vehicle, or a road partition line used as a reference when automated driving is executed not being recognized by the vehicle.

(4) In the vehicle control device according to the aspect of the above (3), the driving controller is configured to shunt the vehicle to a shunt location to suspend the automated driving, and then resume the automated driving in a case where the factor is removed and the environmental level rises to an environmental level higher than a predetermined level.

(5) In the vehicle control device according to any aspect of the above (2) to (4), the driving controller is configured to shunt the vehicle to a shunt location to suspend the automated driving in a case where the environmental level decreases, and an occupant does not perform a predetermined behavior.

(6) In the vehicle control device according to the aspect of the above (5), the predetermined behavior involves the occupant performing manual driving, the occupant monitoring a vicinity, or the occupant monitoring a vicinity and grasping a steering wheel.

(7) In the vehicle control device according to any aspect of the above (2) to (6), the driving controller is configured to shunt the vehicle to a shunt location to suspend the automated driving in a case where the environmental level decreases in a first region including the vehicle, and resume the automated driving after the shunt in a case where a region of the decreased environmental level or lower is not present in a second region including the vehicle, and the first region is a region smaller than the second region.

(8) In the vehicle control device according to the aspect of the above (7), the recognizer is configured to recognize the environmental level of the first region on the basis of a recognition result of a detector provided in a vehicle, and is configured to recognize the environmental level of the second region on the basis of information acquired from an information processing device provided outside the vehicle for providing information.

(9) In the vehicle control device according to any aspect of the above (2) to (8), the driving controller is configured to shunt the vehicle to a shunt location to suspend the automated driving in accordance with a decrease in the environmental level due to a first factor among predetermined factors, and then transition to a preparation mode for reducing electric power of a monitoring device that monitors the vicinity of the vehicle mounted in the vehicle.

(10) In the vehicle control device according to the aspect of the above (9), the driving controller is configured to shunt the vehicle to a shunt location to suspend the automated driving in accordance with a decrease in the environmental level due to a second factor estimated to take a longer time to be removed than the first factor among predetermined factors, and then transition to a power saving mode for reducing electric power of the monitoring device more than the preparation mode.

(11) In the vehicle control device according to any aspect of the above (1) to (10), the driving controller is configured to shunt the vehicle to a shunt location to suspend the automated driving in a case of entering a road on which a first automated driving mode is not able to be executed from a road on which automated driving of the first automated driving mode is able to be executed in map information, and then move the vehicle in a case where it is recognized that a shunt location is required to be changed on the basis of a result of a detector while maintaining a state in which the detector mounted in the vehicle is started up.

(12) The vehicle control device according to any aspect of the above (1) to (11) further includes an output controller that, in a case where the automated driving is resumed, refers to information relating to an automated driving mode executed before the shunt which is stored in a storage, and is configured to cause an output device to output a condition for executing the automated driving mode executed before the shunt, wherein the driving controller is configured to cause the storage to store the automated driving mode executed before the shunt in a case where the vehicle is shunted to a shunt location, and perform automated driving in the automated driving mode executed before the shunt in a case where the condition is satisfied.

(13) According to another aspect of this invention, there is provided a vehicle control method including causing a computer to: recognize a peripheral situation of a vehicle; execute automated driving for controlling a speed and steering of the vehicle on the basis of the recognition result; recognize a real-time environment including a situation of a nearby vehicle or a situation of a nearby road on which the vehicle travels; shunt the vehicle to a shunt location to suspend the automated driving in a case where the real-time environment corresponds to a predetermined condition; and resume the automated driving in a case where the predetermined condition is resolved after the shunt.

(14) According to another aspect of this invention, there is provided a non-transitory computer-readable storage medium that is configured to store a computer program to be executed by a computer, the program causing the computer to at least: recognize a peripheral situation of a vehicle; execute automated driving for controlling a speed and steering of the vehicle on the basis of the recognition result; recognize a real-time environment including a situation of a nearby vehicle or a situation of a nearby road on which the vehicle travels; shunt the vehicle to a shunt location to suspend the automated driving in a case where the real-time environment corresponds to a predetermined condition; and resume the automated driving in a case where the predetermined condition is resolved after the shunt.

According to (1) to (14), the vehicle control device is configured to shunt the vehicle to a shunt location to suspend the automated driving in a case where the real-time environment corresponds to a predetermined condition, and resume the automated driving in a case where the predetermined condition is resolved after the shunt, whereby it is possible to realize control of the vehicle according to an environment.

According to (7), the vehicle control device improves an occupant's convenience by resuming the automated driving in a case where it is estimated that the automated driving can be continued for a predetermined distance or time.

According to (9), the vehicle control device is configured to stop the vehicle, and then instruct the monitoring device that is configured to monitor the vicinity of the vehicle mounted in the vehicle to reduce electric power, whereby it is possible to reduce electric power stored in a power storage of the vehicle.

According to (11), the vehicle control device is configured to shunt the vehicle to a shunt location to suspend the automated driving in the case of entering a road on which a first automated driving mode is not able to be executed from a road on which automated driving of the first automated driving mode is able to be executed in map information, and then move the vehicle in a case where it is recognized that a shunt location is required to be changed, whereby it is possible to further improve an occupant's convenience.

According to (12), the vehicle control device is configured to cause the output device to output a condition for executing an automated driving mode executed before the shunt in a case where the automated driving is resumed, whereby an occupant can more easily recognize a condition for resuming the automated driving mode.

BRIEF DESCRIPTION OF THE DRAWINGS

FIG. 12 is a diagram illustrating a relationship among an environmental level, content of executable automated driving, and a situation in the vicinity of a road.

DETAILED DESCRIPTION

Hereinafter, embodiments of a vehicle control device, a vehicle control method, and a storage medium of the present invention will be described with reference to the accompanying drawings. In the following, a description will be given on the premise of countries or districts in which rules of left-hand traffic are applied, but in a case where rules of right-hand traffic are applied, the right and left may be interchanged when reading. As used throughout this disclosure, the singular forms "a," "an," and "the" include plural reference unless the context clearly dictates otherwise.

First Embodiment

[Overall Configuration]

Figure 1:
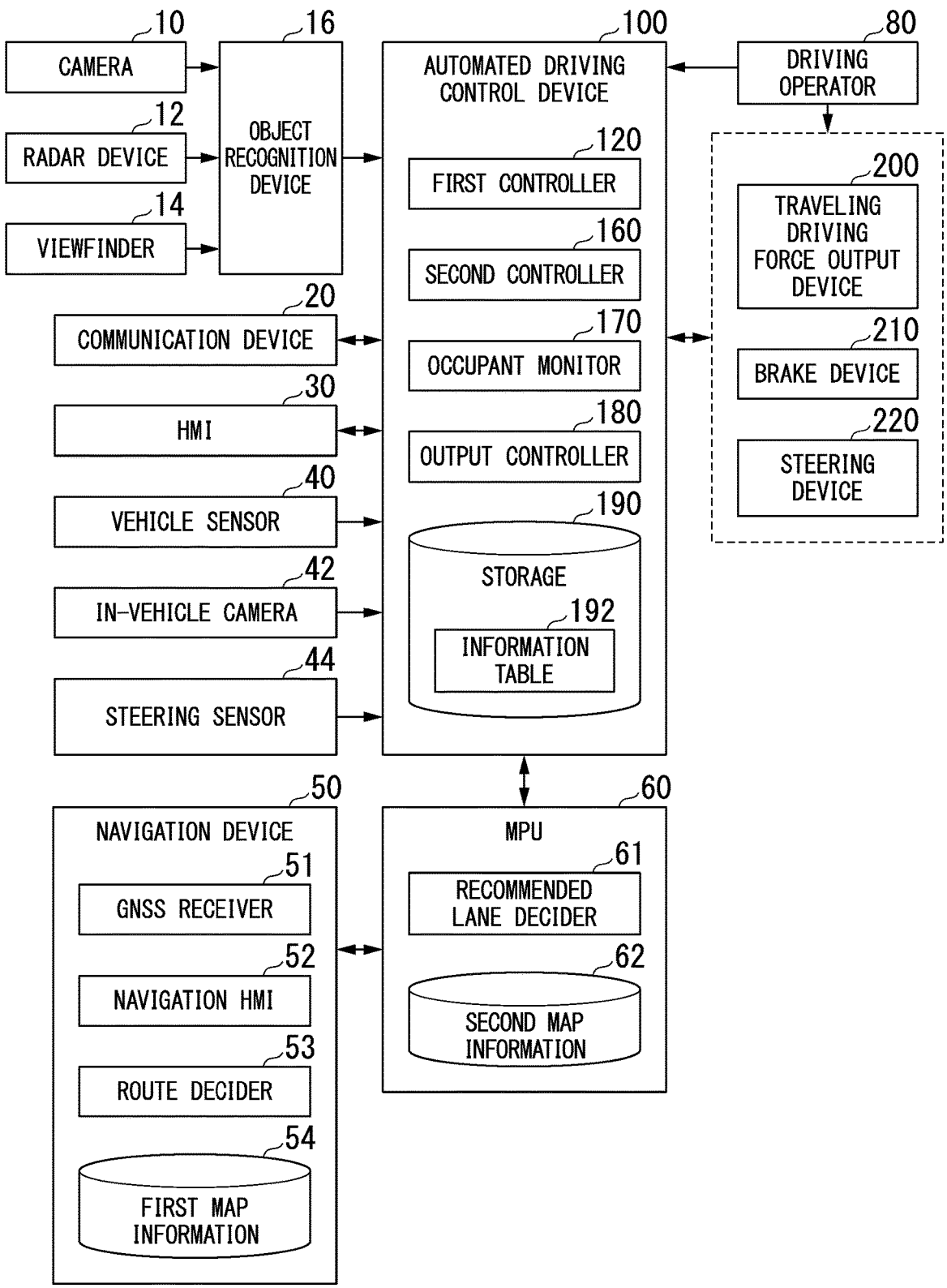
FIG. 1 is a configuration diagram of a vehicle system in which a vehicle control device according to a first embodiment is used.

FIG. 1 is a configuration diagram of a vehicle system 1 in which a vehicle control device according to a first embodiment is used. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device 20, a human machine interface (HMI) 30, a vehicle sensor 40, an in-vehicle camera 42, a steering sensor 44, a navigation device 50, a map positioning unit (MPU) 60, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any points on a vehicle having the vehicle system 1 mounted therein (hereinafter referred to as a vehicle M). In a case where a forward image is captured, the camera 10 is installed on the upper portion of the front windshield, the rear surface of the rear-view mirror, or the like. In a case where a rearward image is captured, the camera 10 is installed on the upper portion of the rear windshield or the like. The camera 10, for example, repeatedly captures an image of the vicinity of the vehicle M periodically. The camera 10 may be a stereo camera.

The radar device 12 radiates radio waves such as millimeter waves to the vicinity of the vehicle M, and detects radio waves (reflected waves) reflected from an object to detect at least the position (distance to and orientation of) of the object. The radar device 12 is installed at any point of the vehicle M. The radar device 12 may detect the position and speed of an object with a frequency modulated continuous wave (FM-CW) system.

The viewfinder 14 is a light detection and ranging (LIDAR) viewfinder. The viewfinder 14 irradiates the vicinity of the vehicle M with light, and measures scattered light. The viewfinder 14 detects a distance to an object on the basis of a time from light emission to light reception. The irradiation light is, for example, pulsed laser light. The viewfinder 14 is installed at any points on the vehicle M.

The object recognition device 16 recognizes the position, type, speed, or the like of an object by performing a sensor fusion process on the results of detection performed by some or all of the camera 10, the radar device 12, and the viewfinder 14. The object recognition device 16 outputs recognition result to the automated driving control device 100. The object recognition device 16 may output the detection results of the camera 10, the radar device 12, and the viewfinder 14, as they are, to the automated driving control device 100. The object recognition device 16 may be omitted from the vehicle system 1.

The communication device 20 communicates with another vehicle which is present in the periphery of the vehicle M using, for example, a cellular network, a Wi-Fi network, Bluetooth (registered trademark), dedicated short range communication (DSRC), or the like, or communicates with various server devices through a wireless base station.

The HMI 30 presents various types of information to an occupant of the vehicle M, and receives the occupant's input operation. The HMI 30 includes various display devices, a speaker, a buzzer, a touch panel, a switch, a key, and the like.

The vehicle sensor 40 includes a vehicle speed sensor that detects the speed of the vehicle M, an acceleration sensor that detects an acceleration, a yaw rate sensor that detects an angular velocity around a vertical axis, an orientation sensor that detects the direction of the vehicle M, or the like.

The in-vehicle camera 42 is a digital camera using a solid-state imaging element such as, for example, a CCD or a CMOS. The in-vehicle camera 42 may be a stereo camera. The in-vehicle camera 42 is installed at any point inside the vehicle M. The in-vehicle camera 42 captures an image of a region including a driver's seat which is present inside the vehicle. That is, the in-vehicle camera 42 captures an image of an occupant who sits on a driver's seat. The in-vehicle camera 42 captures an image of the region periodically repeatedly.

The steering sensor 44 is provided at a predetermined position of a steering wheel. For example, the steering wheel is provided with a plurality of steering sensors. The predetermined position is, for example, a portion which is operated (grasped or contacted) by a driver such as a rim part. The steering sensor 44 is, for example, a sensor that detects a change of capacitance.

The navigation device 50 includes, for example, a global navigation satellite system (GNSS) receiver 51, a navigation HMI 52, and a route decider 53. The navigation device 50 holds first map information 54 in a storage device such as a hard disk drive (HDD) or a flash memory. The GNSS receiver 51 specifies the position of the vehicle M on the basis of a signal received from a GNSS satellite. The position of the vehicle M may be specified or complemented by an inertial navigation system (INS) in which an output of the vehicle sensor 40 is used. The navigation HMI 52 includes a display device, a speaker, a touch panel, a key, or the like. The navigation HMI 52 may be partly or wholly shared with the above-described HMI 30. The route decider 53 decides, for example, a route (hereinafter, a route on a map) from the position (or any input position) of the vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane decider 61, and holds second map information 62 in a storage device such as an HDD or a flash memory. The recommended lane decider 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decider 61 makes a decision on which lane from the left to travel in. In a case where a branch point is present in the route on a map, the recommended lane decider 61 decides a recommended lane so that the vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, a blinker lever, a microphone, various types of switches, or the like. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, a second controller 160, an occupant monitor 170, an output controller 180, and a storage 190. The first controller 120, the second controller 160, the occupant monitor 170, and the output controller 180 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory of the storage 190 in advance, may be stored in a detachable storage medium such as a DVD or a CD-ROM, or may be installed in the HDD or the flash memory of the automated driving control device 100 by the storage medium being mounted in a drive device.

Figures 2, 3:
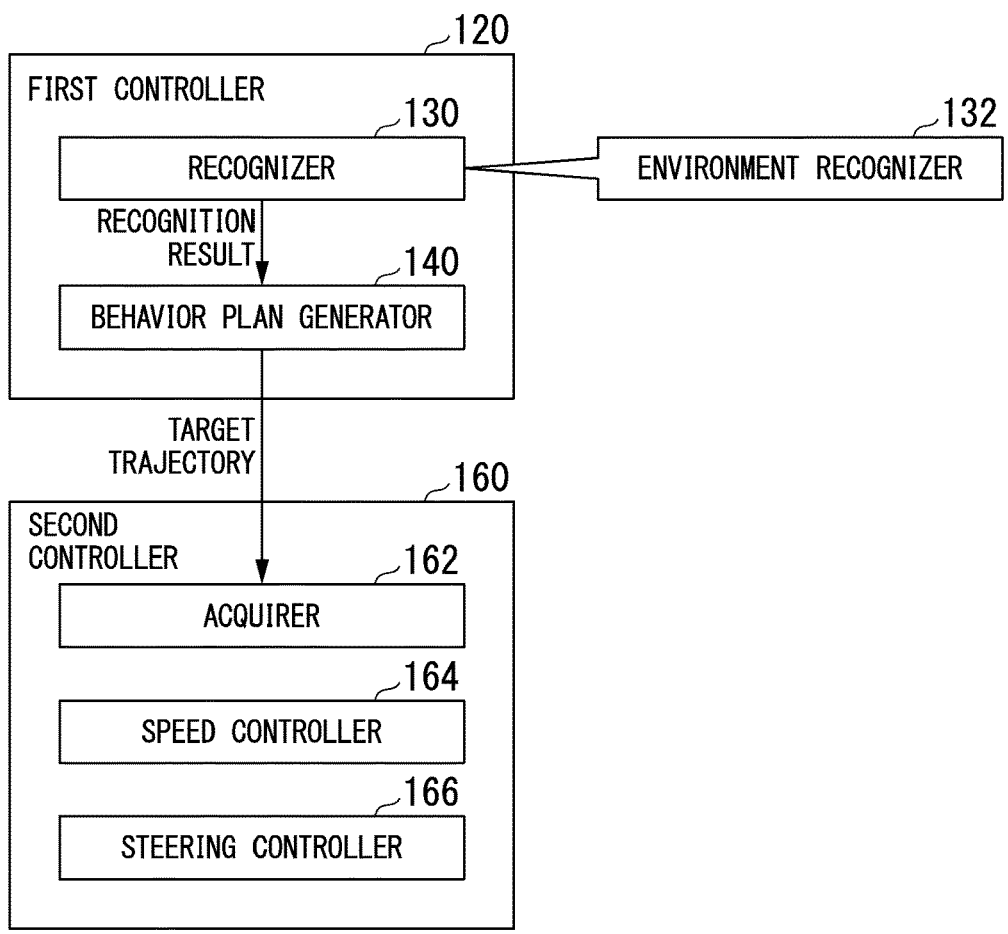
FIG. 2 is a diagram illustrating an example of content of an information table.
FIG. 3 is a functional configuration diagram of a first controller and a second controller.

The storage 190 stores an information table 192. FIG. 2 is a diagram illustrating an example of content of the information table 192. The information table 192 is, for example, information in which a section (for example, a link) and a driving state (such as a driving state A or a driving state B to be described later) of executable automated driving are associated with each other. The driving state of executable automated driving is a driving state in which the degree of automation (to be described later) is highest in executable automated driving. For example, a road to pass through at the time of entering a region such as a tollbooth, a predetermined branch route, and the like are associated with the information table 192 as a section in which automated driving cannot be executed or a section in which the driving state A cannot be executed. The information table 192 may be included in the first map information 54 or the second map information 62, and the information table 192 may include the first map information 54, the second map information 62, or other map information.

The occupant monitor 170 determines whether an occupant (an occupant who sits on a driver's seat) monitors the vicinity of the vehicle. The occupant monitor 170 analyzes an image captured by the in-vehicle camera 42, and derives the direction of a driver's face or the direction of his (or her) eyes on the basis of the analysis result. For example, in a case where it is determined that the derived direction of the driver's face or direction of his (or her) eyes is within a reference range, the occupant monitor 170 determines that an occupant monitors its vicinity.

The occupant monitor 170 monitors the state of an occupant (an occupant who sits a driver's seat). The occupant monitor 170 analyzes an image captured by the in-vehicle camera 42, and derives the degree of awakening, posture and the like of a driver on the basis of the analysis result. For example, the occupant monitor 170 derives an awakening index indicating the degree of awakening of the driver on the basis of the states of those derived.

The occupant monitor 170 determines whether a driver is operating or grasping a steering wheel. The occupant monitor 170 determines whether the driver's hand is touching the steering wheel. The occupant monitor 170 acquires a detection result detected by the steering sensor 44, and determines whether the steering sensor 44 is being operated or the like on the basis of the acquired detection result. For example, the occupant monitor 170 compares a detection value of the steering sensor 44 acquired at a first time with a detection value of the steering sensor 44 acquired at a second time, and determines that the driver is operating or the like the steering wheel in a case where the detection value changes to a threshold or greater. In a case where the acquired detection value of the steering sensor 44 is within a predetermined range, the occupant monitor 170 may determine that the driver is operating or the like the steering wheel. The occupant monitor 170 may determine whether the driver is operating or the like the steering wheel by adding the analysis result of the image captured by the in-vehicle camera 42.

FIG. 3 is a functional configuration diagram of the first controller 120 and the second controller 160. The first controller 120 includes, for example, a recognizer 130 and a behavior plan generator 140. The recognizer 130 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes the position and speed of an object near the vehicle M, and the state of acceleration or the like on the basis of information which is input from the camera 10, the radar device 12, and the viewfinder 14 through the object recognition device 16. The object may be another vehicle. The position of the object is recognized as, for example, a position in absolute coordinates with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes, for example, a lane (traveling lane) along which the vehicle M travels. For example, the recognizer 130 may recognize a traveling lane by comparing a pattern of a road partition line (for example, an array of solid lines and broken lines) obtained from the second map information 62 with a pattern of a road partition line located in the vicinity of the vehicle M which is recognized from an image captured by the camera 10. The recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the vehicle M acquired from the navigation device 50 or processing results based on an INS may be added. The recognizer 130 recognizes a stop line, an obstacle, a red light, a tollbooth, and other road events.

Upon recognizing a traveling lane, the recognizer 130 recognizes the position or posture of the vehicle M with respect to the traveling lane. The recognizer 130 may recognize, for example, deviation of the vehicle M from the center of the lane which is a representative point, and an angle formed with respect to a line aligned with the center of the lane of the vehicle M in its traveling direction, as the relative position and posture of the vehicle M with respect to the traveling lane. Instead, the recognizer 130 may recognize the position of the representative point of the vehicle M or the like with respect to either lateral end portion (a road partition line or a road boundary) of the traveling lane, as the relative position of the vehicle M with respect to the traveling lane.

The recognizer 130 includes an environment recognizer 132. The environment recognizer 132 recognizes, for example, the real-time environment of a road on which the vehicle M travels. The real-time environment of a road includes the situation of a nearby vehicle present on the road or the situation of a nearby road. For example, the environment recognizer 132 recognizes whether the real-time environment corresponds to a predetermined condition, or the predetermined condition is resolved. The term "predetermined condition" refers to a real-time environment that has occurred due to a predetermined factor to be described later. The environment recognizer 132 recognizes an environmental level indicating a real-time environment. The environment recognizer 132 recognizes, for example, that the environmental level is equal to or greater than a threshold or less than the threshold. The environment recognizer 132 may recognize a stepwise environmental level such as environmental levels 1, 2, and 3. The environment recognizer 132 recognizes an environmental level on the basis of some or all of techniques such as, for example, a function based on AI, a function based on a model imparted in advance, or a pattern matching process. The details of the process of the environment recognizer 132 will be described later.

The behavior plan generator 140 generates a target trajectory along which the vehicle M will travel in the future automatically (irrespective of a driver's operation) so that the vehicle M travels in the recommended lane decided by the recommended lane decider 61 in principle and can cope with the peripheral situation of the vehicle. The target trajectory includes, for example, a speed element. For example, the target trajectory may be represented as a trajectory obtained by arranging points (trajectory points) at which the vehicle M will arrive in order. The trajectory points are points at which the vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the vehicle M will arrive at sampling times for respective predetermined sampling times. In this case, information of a target speed or target acceleration is represented by an interval between trajectory points.

The behavior plan generator 140 may set automated driving events when generating a target trajectory. Examples of the automated driving events include a constant-speed traveling event, a following traveling event of following a preceding vehicle m at a predetermined vehicle speed (for example, 60 [km]) or lower, a lane change event, a divergence event, a merging event, an overtaking event, and the like. The behavior plan generator 140 generates a target trajectory according to a started event.

The behavior plan generator 140 controls a vehicle in any of, for example, a driving state A, a driving state B, and a driving state C. The driving state A, the driving state B, and the driving state C are driving states in increasing order of the degree of automation regarding control of a vehicle (A>B>C). A high degree of automation means that the degree of control of a vehicle is low on the basis of the degree of an occupant's operation of the vehicle. A high degree of automation means that the degree of the automated driving control device 100 controlling a vehicle is high. The degree of automation is linked to a duty to monitor the vicinity of a vehicle which is required of a driver, and the degree of automation can be paraphrased as the degree of a duty to monitor the vicinity of a vehicle which is required of a driver. A high degree of automation means that a duty to monitor the vicinity of a vehicle which is required of a driver is low, and a low degree of automation means that a duty to monitor the vicinity of a vehicle which is required of a driver is high. Hereinafter, an example of the driving state A to the driving state C will be described.

The driving state A is, for example, a driving state in which a vehicle can automatically control its speed and steering in a state where an occupant is not operating a steering wheel (not grasping, holding, or touching the steering wheel), and the occupant is not monitoring the vicinity of the vehicle. The driving state B is a driving state in which the vehicle can automatically control its speed and steering in a state where the occupant is not operating the steering wheel and the occupant is monitoring the vicinity of the vehicle (or a state where the degree of monitoring is lower than the degree of monitoring in the driving state A).

The driving state C is, for example, a driving state in which at least a task of monitoring the vicinity related to safe driving (such as a forward gaze) is imposed on a driver. The driving state C is, for example, a driving state in which the vehicle can automatically control its speed and steering in a state where the occupant operates the steering wheel and the occupant is monitoring the vicinity of the vehicle.

The driving state C may be a state in which the driver is performing manual driving. The driving state C may be a state in which an advanced driver assistance system (ADAS) is operating. The ADAS is a driving assistance system which is represented by an adaptive cruise control system (ACC) or a lane keeping assist system (LKAS).

In the driving state A to the driving state C, for example, following travel of following the preceding vehicle m that travels in front of the vehicle M may be performed. The following travel is control for following the preceding vehicle m while the vehicle M maintains a predetermined inter-vehicle distance between the vehicle M and the preceding vehicle m (for example, a predetermined distance according to its speed). In a case where the preceding vehicle m which is a following target is not present in a driving state where the following travel is being performed, the following control is released. In this case, a process for transitioning to a driving state having a lower degree of automation than the driving state in which the following control is being performed is executed. For example, the process for transitioning to a driving state having a low degree of automation involves a notification for requesting the driver to monitor the vicinity, a notification for requesting the driver to grasp the steering wheel, or the like being performed by the HMI 30. The case where the preceding vehicle m which is a following target is not present involves the preceding vehicle m traveling in a different direction and to a different lane from the traveling direction of the vehicle M.

Conditions for controlling the driving state A to the driving state C described above are an example, and may be arbitrarily set in a case where the degree of automation of the vehicle is high in the order of the driving state A, the driving state B, and the driving state C. For example, some or all of the driving state A to the driving state C may be a state of automated driving, or some or all of the driving state A to the driving state C may be a state in which driving assistance is executed rather than the state of automated driving. Instead of the three driving states, the present embodiment may be applied in two or more driving states.

The behavior plan generator 140 refers to the information table 192, for example, in a section from a departure point to a destination designated by the occupant, and sets a section in which the automated driving can be executed. The behavior plan generator 140 executes the automated driving in the set section. A section in which the automated driving is performed may be designated by the occupant, or may be set by the behavior plan generator 140.

The behavior plan generator 140 shunts the vehicle M to a shunt location to suspend the automated driving in the case of entering a road on which automated driving of a predetermined driving state cannot be executed from a road on which automated driving of the predetermined driving state can be executed in the information table 192, and then moves the vehicle in a case where it is recognized that the shunt location is required to be changed on the basis of the result of the detector while maintaining a state in which the camera 10, the radar device 12, the viewfinder 14, the object recognition device 16 (detector), or the like mounted in the vehicle M is started up. In the case of entering a road on which the automated driving of a predetermined driving state cannot be executed, the output controller 180 prompts the occupant to perform manual driving or behavior according to a driving state that can be executed on the road. In a case where the occupant has performed manual driving or behavior according to a road in response to a notification which is output by the output controller 180, the behavior plan generator 140 performs manual driving or automated driving according to a road without shunting the vehicle M to the shunt location.

The second controller 160 controls the traveling driving force output device 200, the brake device 210, and the steering device 220 so that the vehicle M passes along the target trajectory generated by the behavior plan generator 140 according to scheduled times. A combination of the behavior plan generator 140 and the second controller 160 is an example of a "driving controller."

The second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the vehicle M and feedback control based on deviation from the target trajectory.

Referring back to FIG. 1, the output controller 180 causes the HMI 30 to perform, for example, a predetermined notification. The predetermined notification is a notification for requesting the occupant to grasp the steering wheel or a notification for requesting the occupant to monitor the vicinity.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an ECU that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Processing According to Environmental Change]

The behavior plan generator 140 shunts the vehicle to a shunt location to suspend the automated driving in a case where a real-time environment corresponds to a predetermined condition, and resumes the automated driving in a case where the predetermined condition is resolved after the shunt. For example, the behavior plan generator 140 shunts the vehicle to the shunt location to suspend the automated driving in a case where the conditions correspond to a real-time environment that has occurred due to a predetermined factor to be described later (for example, a real-time environment in which an emergency vehicle is stopped on a road), and resumes the automated driving in a case where the real-time environment that has occurred due to a predetermined factor is resolved (for example, the emergency vehicle has left) after the shunt.

For example, the behavior plan generator 140 shunts the vehicle to the shunt location to suspend the automated driving in accordance with a decrease in an environmental level indicating a real-time environment, and resumes the automated driving in a case where, after the shunt, the environmental level rises to an environmental level higher than the environmental level during the shunt.

In this process, for example, in a case where the environmental level is the environmental level 1 or higher, the vehicle M can execute the automated driving in the driving state A, and in a case where the environmental level is less than the environmental level 1, the vehicle M does not execute the automated driving in the driving state A. Instead of this process, the same process may also be performed in a case where an environmental level at which the driving state B or the driving state C can be executed decreases.

Figure 4:
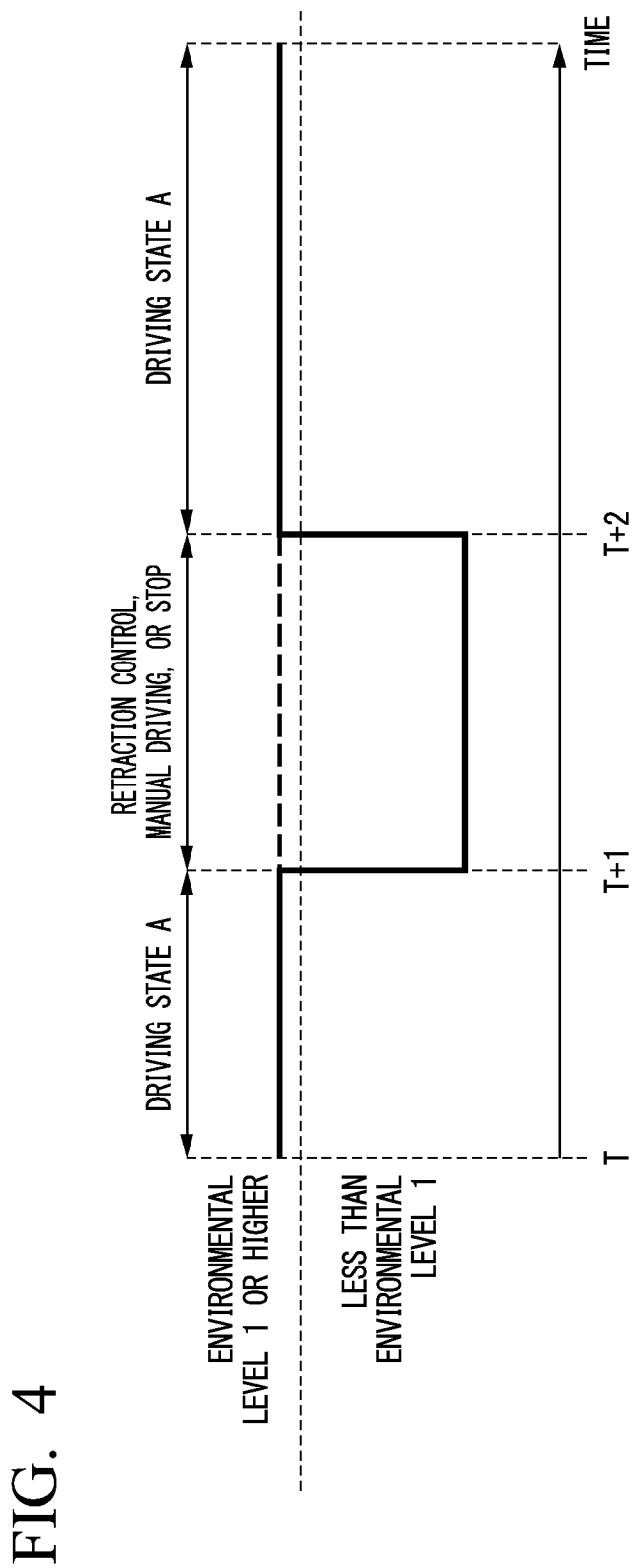
FIG. 4 is a diagram illustrating an outline of a process which is executed by an automated driving control device.

FIG. 4 is a diagram illustrating an outline of a process which is executed by the automated driving control device 100. The horizontal axis of FIG. 4 represents time, and the vertical axis of FIG. 4 represents an environmental level. For example, the behavior plan generator 140 refers to the information table 192, and decides that the driving state A is executed because the section from a departure point to a destination is a section of the environmental level 1 or higher. For example, in a case where the driving state A is executed at time T, and it is recognized to be less than the environmental level 1 at time T+1, the behavior plan generator 140 executes retraction control. In a case where the environmental level returns to the environmental level 1 or higher at time T+2, the automated driving is resumed in the driving state A.

As described above, the state of being less than the environmental level 1 is caused by a predetermined factor. Examples of the predetermined factors include construction being performed, the presence of a vehicle which has stopped on a road in an emergency, an emergency vehicle approaching, the vehicle M not being able to recognize a road partition line used as a reference when the vehicle M executes the automated driving, and the like. These factors are short-term factors (first factors) having a high possibility of being removed in a relatively short term (for example, approximately several tens of minutes to an hour). Predetermined factors of the state of being less than the environmental level 1 may be caused by long-term factors (second factors). The long-term factors are factors which are not removed in the short term. Examples of the long-term factors include the vehicle M not having map information to be referred to during the automated driving, the automated driving being continued (a driver not performing manual driving) in an area in which the degree of difficulty of passing through by the automated driving being a predetermined value or more (a region including a tollbooth or the like), and the like. For example, in a case where the environmental level is set to be less than the environmental level 1 due to a short-term factor, the environmental level is set to be the environmental level 1 or higher by the short-term factor being removed. The state of being less than the environmental level 1 is an example of a case where a real-time environment corresponds to a predetermined condition, and the state of being the environmental level 1 or higher is an example of a case where the predetermined condition is resolved.

In a case where a short-term factor or a long-term factor is recognized, the environment recognizer 132 recognizes that the environmental level is less than the threshold (the environmental level 1). The environment recognizer 132 recognizes whether the recognized factor is a short-term factor or a long-term factor.

In this manner, the behavior plan generator 140 shunts the vehicle M to the shunt location to suspend the automated driving in a case where the environmental level changes to less than the threshold (for example, the environmental level 1) when the vehicle is traveling on a road associated with the environmental level 1 or higher in the information table 192 (map information).

Further, the behavior plan generator 140 shunts the vehicle M to the shunt location to suspend the automated driving, and then resume the automated driving in a case where a factor (for example, a short-term factor) is removed and thus the environmental level rises to the environmental level 1 or higher (a case where it rises to an environmental level higher than a predetermined level). Hereinafter, these processes will be described.

[Flow Chart]

Figure 5:
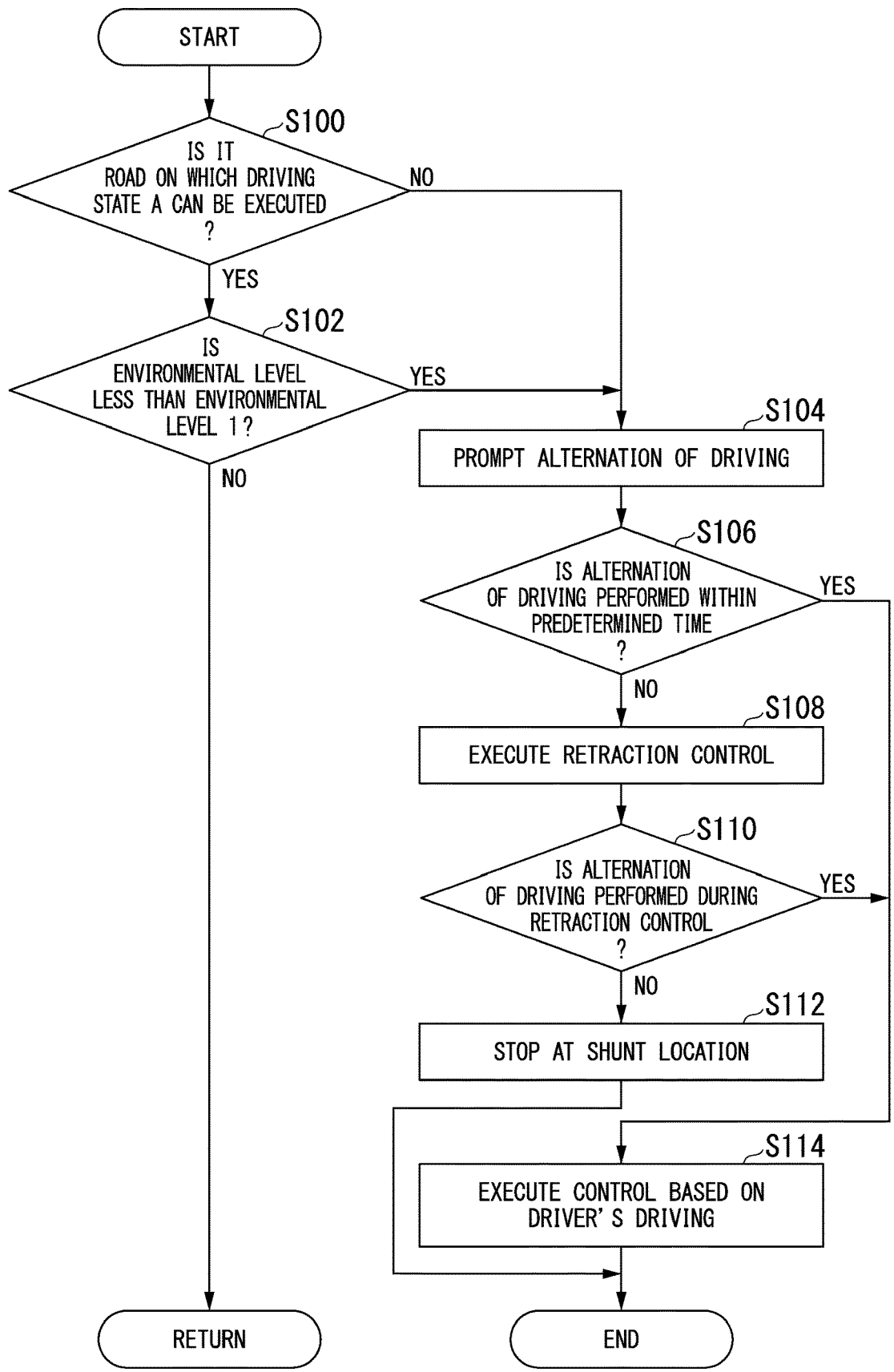
FIG. 5 is a first flow chart illustrating an example of a flow of processes which are executed by the automated driving control device.

FIG. 5 is a first flow chart illustrating an example of a flow of processes which are executed by the automated driving control device 100. First, the behavior plan generator 140 refers to the information table 192, and determines whether a road on which the vehicle M is traveling is a road on which the driving state A can be executed (step S100). In a case where it is determined that the road on which the vehicle M is traveling is a road on which the driving state A can be executed, the behavior plan generator 140 determines whether the environmental level is less than the environmental level 1 (predetermined level) (step S102). The behavior plan generator 140 determines whether the environmental level is less than the environmental level 1 on the basis of, for example, the recognition result of the environment recognizer 132. In a case where it is determined that the environmental level is not less than the environmental level 1, processing of one routine of the present flow chart is finished.

In a case where it is determined that the road on which the vehicle M is traveling is not a road on which the driving state A can be executed, or a case where it is determined that the environmental level is less than the environmental level 1, the output controller 180 performs a notification for prompting the occupant to perform driving (alternation of driving) using HMI 20 (step S104).

Next, the behavior plan generator 140 determines whether alternation of driving (predetermined behavior) is performed within a predetermined time (step S106). In a case where the alternation of driving is performed within a predetermined time, the flow proceeds to the process of step S114. For example, the behavior plan generator 140 determines that the alternation of driving has been performed in a case where the occupant monitor 170 determines that the occupant grasps the steering wheel and monitors the vicinity (determines that predetermined behavior has been performed).

In a case where the alternation of driving is not performed within a predetermined time, the behavior plan generator 140 executes the retraction control (step S108). The retraction control involves the behavior plan generator 140 controlling the vehicle M so as to shunt the vehicle to the shunt location. The retraction control is, for example, control for the behavior plan generator 140 to stop the vehicle M at the shunt location. The shunt location is a position at which the passage of other traffic participants (vehicles or pedestrians) is not obstructed such as, for example, the shoulder of a road or stoppable spaces around the road.

Next, the behavior plan generator 140 determines whether the alternation of driving is performed during the retraction control (step S110). In a case where the alternation of driving is not performed during the retraction control, the behavior plan generator 140 stops the vehicle M at the shunt location (step S112). In a case where the alternation of driving is performed during the retraction control, or a case where the alternation of driving is performed within a predetermined time in step S106, the behavior plan generator 140 executes control based on a driver's driving (step S114). That is, the occupant controls the vehicle M by manual driving. This concludes the process of the present flow chart.

In the above processes, the behavior plan generator 140 may stop the vehicle M at the shunt location in the process of step S112, and then transition to a preparation mode for reducing electric power of the camera 10, the radar device 12, the viewfinder 14, and the object recognition device 16 (hereinafter, each of these components may be referred to as a "monitoring device") that monitor the vicinity of the vehicle M mounted in the vehicle M. The behavior plan generator 140 shunts the vehicle M to the shunt location to suspend the automated driving in accordance with a decrease in the environmental level due to a short-term factor (first factor) among predetermined factors, and then transitions to the preparation mode. For example, in the case of transition to the preparation mode, the behavior plan generator 140 instructs the monitoring device to reduce its electric power in the preparation mode.

The behavior plan generator 140 may shunt the vehicle M to the shunt location to suspend the automated driving in accordance with a decrease in the environmental level due to a long-term factor (second factor) estimated to take a longer time to be removed than a short-term factor (first factor) among predetermined factors, and then transition to a power saving mode. The power saving mode is a mode for reducing electric power more than the preparation mode. In the case of transition to the power saving mode, the behavior plan generator 140 instructs the monitoring device to reduce its electric power in the power saving mode. In the case of entering a road on which the driving state A (a predetermined driving state) cannot be executed from a road on which the driving state A (or a predetermined driving state) can be executed in the information table 192, the behavior plan generator 140 may transition to the power saving mode when control for shunting the vehicle M to the shunt location to suspend the automated driving is executed. The relation of power consumption of the vehicle M is automated driving>manual driving>preparation mode>power saving mode. In a case where the automated driving is executed, a processing load related to the automated driving is larger than a processing load in a case where the manual driving is executed. The degree of operation (degree of processing) of the monitoring device in a case where the manual driving is executed is higher than the degree of operation in the preparation mode and the power saving mode. The degree of operation in the preparation mode is higher than the degree of operation in the power saving mode. For example, the sampling period of the monitoring device in the preparation mode is shorter than the sampling period of the monitoring device in the power saving mode. For example, the preparation mode is a mode in which a monitoring device that monitors a wall direction or a predetermined region is set to be in an off-state in a state where the monitoring device is operating, and the power saving mode is a mode in which a monitoring device such as a camera that does not need to be monitored is set to be in an off-state in order to suppress power consumption much more than the preparation mode.

Figure 6:
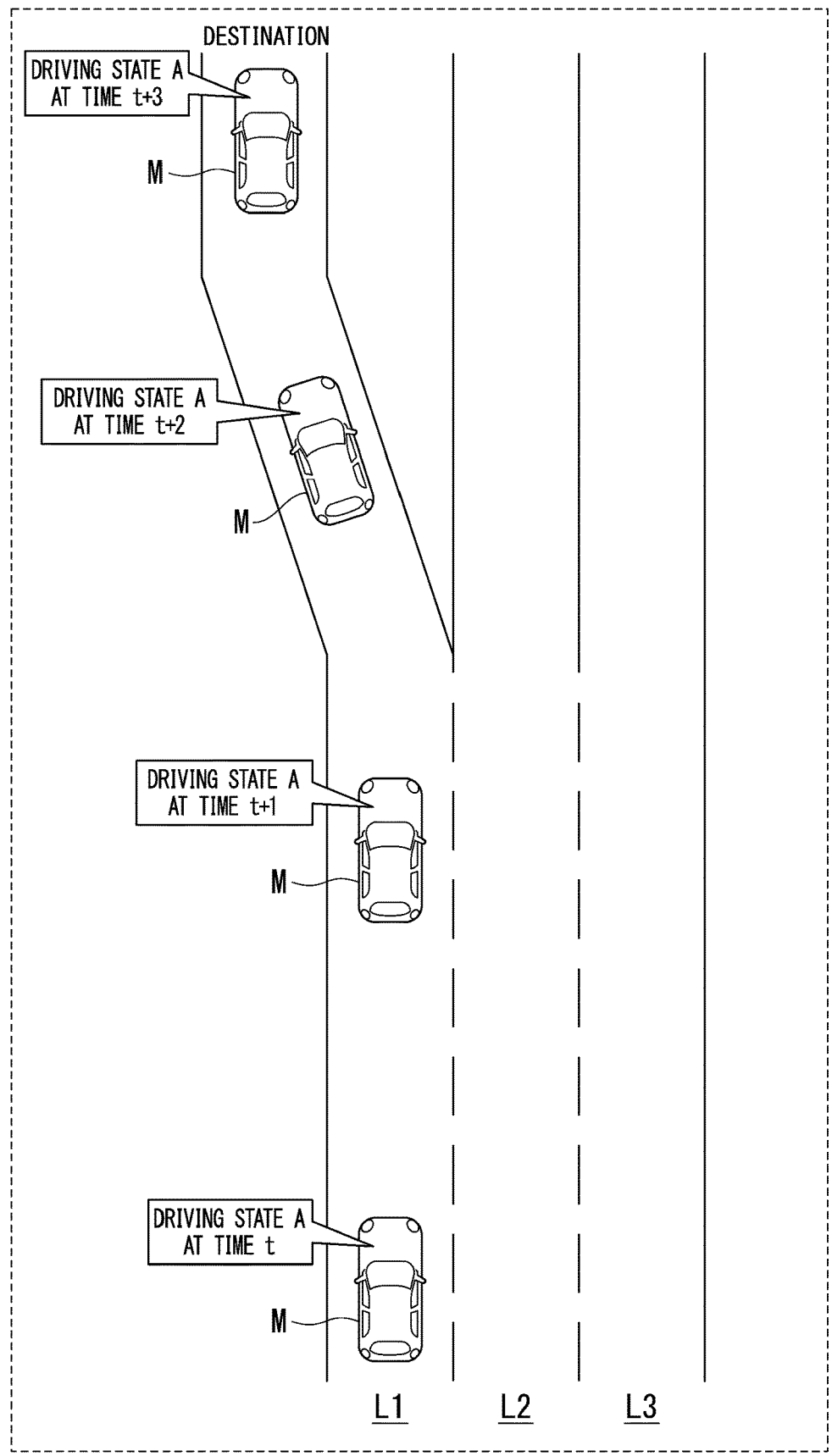
FIG. 6 is a diagram illustrating an example of a situation in which a vehicle does not perform retraction control.

FIG. 6 is a diagram illustrating an example of a situation in which the vehicle M does not perform the retraction control. For example, on a road including lanes L1, L2, and L3, the lanes L2 and L3 are main lines, and the lane L1 is assumed to be a lane connected to a branch route that branches from the main line. In the example of FIG. 6, the vehicle M is assumed to be traveling in the driving state A.

At time t to time t+3, the vehicle M is traveling in the lane L1 in order to head toward the branch route. In this case, the environment recognizer 132 recognizes that the environmental level in the vicinity of the vehicle M is the environmental level 1 or higher. This is because an event or an object influencing the traveling of the vehicle M is not present on the road (the lane L1 or the vicinity of the lane L1). In this manner, in a case where the environmental level is the environmental level 1 or higher, the vehicle M travels in the lane L1 in the driving state A.

Figure 7:
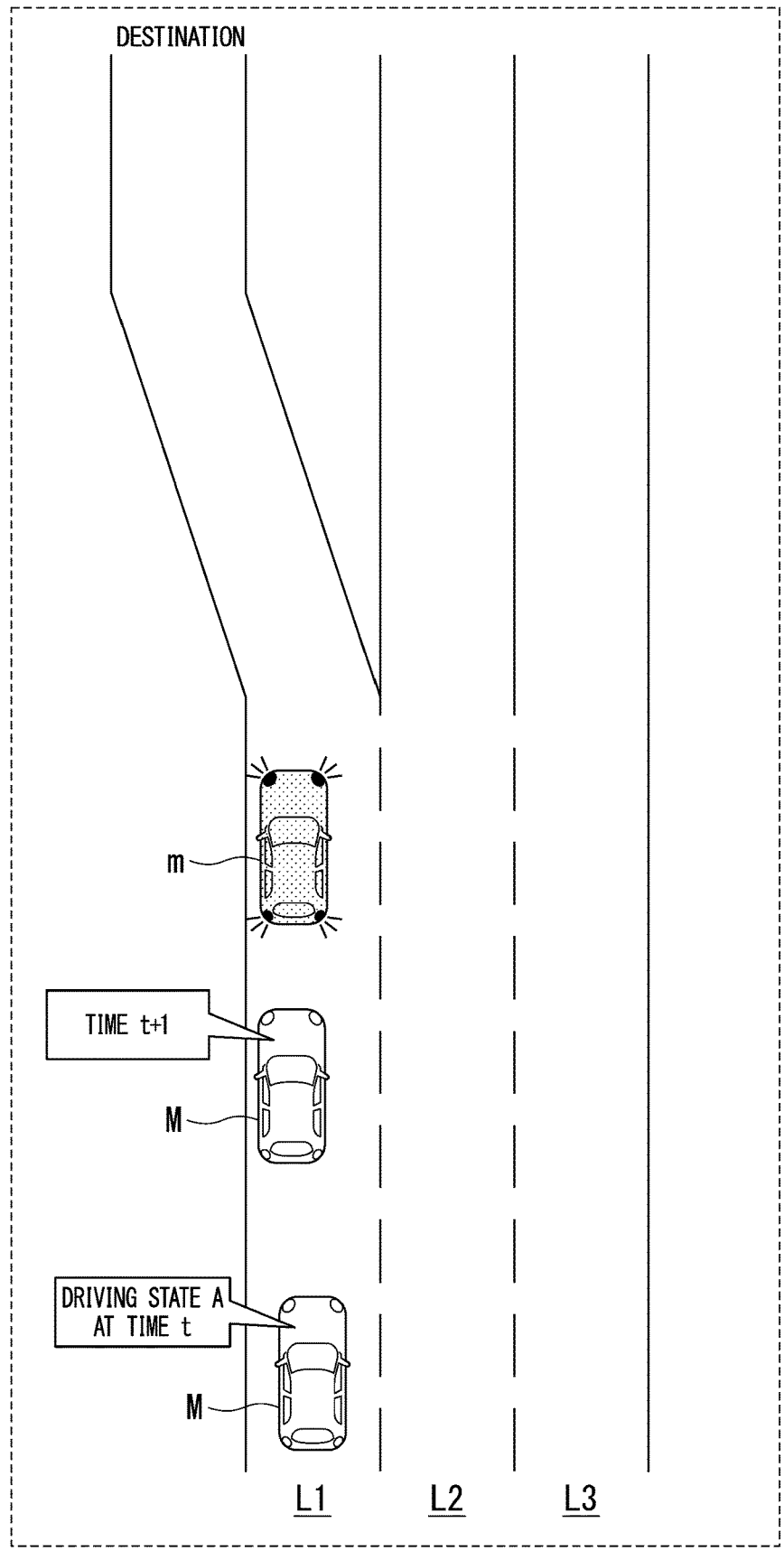
FIG. 7 is a diagram illustrating an example of a situation in which the vehicle performs retraction control.

FIG. 7 is a diagram illustrating an example of a situation in which the vehicle M performs the retraction control. A description will be given with focus on differences from the description of FIG. 6. At time t, the environment recognizer 132 recognizes that another vehicle m stopping in front of the vehicle M is present when the vehicle M is traveling in the lane L1 in order to head toward the branch route. In this case, the environment recognizer 132 recognizes that the environmental level in the vicinity of the vehicle M is less than the environmental level 1. This is because an event or an object (another vehicle m) influencing the traveling of the vehicle M is present on the road (particularly, the lane L1).

In this manner, in a case where the environmental level is less than the environmental level 1, the vehicle M cannot continue to travel in the driving state A. In a case where the alternation of driving is not performed within a predetermined time from when it is recognized that the environmental level is less than the environmental level 1, the retraction control is performed. At time t+1, the vehicle M stops in the rear of another vehicle m. After the vehicle M stops by the retraction control, the process of the flow chart of FIG. 8 is executed.

Figure 8:
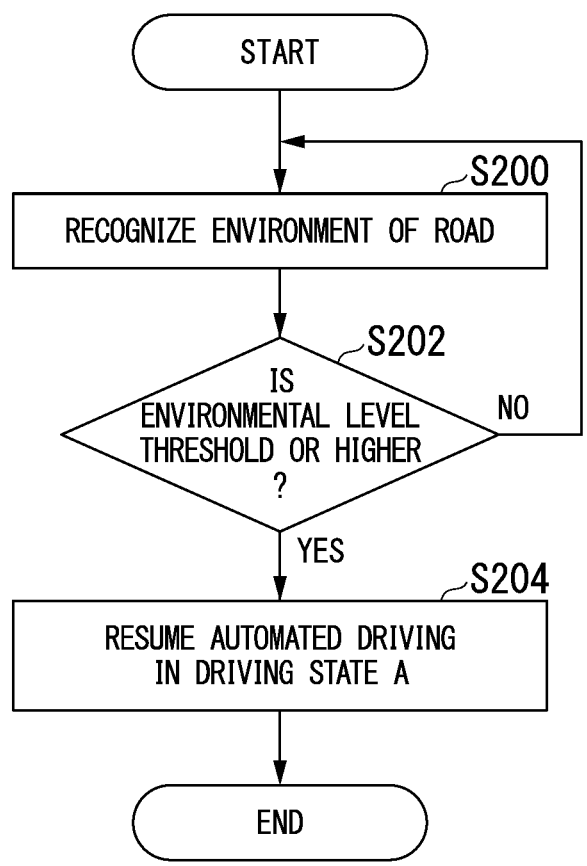
FIG. 8 is a second flow chart illustrating an example of a flow of processes which are executed by the automated driving control device.

FIG. 8 is a second flow chart illustrating an example of a flow of processes which are executed by the automated driving control device 100. First, the environment recognizer 132 recognizes the environment of a road (step S200). Next, the behavior plan generator 140 determines whether the environmental level is the environmental level 1 (threshold) or higher on the basis of the recognition result of the environment recognizer 132 (step S202). In a case where the environmental level is not the environmental level 1 or higher, the flow returns to the process of step S200.

In a case where the environmental level is the environmental level 1 or higher, the behavior plan generator 140 resumes the automated driving in the driving state A (step S204). In a case where the vehicle M is shunted to the shunt location in the process of the flow chart of FIG. 8, the behavior plan generator 140 stores an automated driving mode executed before the shunt in the storage. In a case where a condition for resuming the automated driving in the driving state A is satisfied, the behavior plan generator 140 performs the automated driving in the automated driving mode executed before the shunt. This concludes the process of the present flow chart. For example, the target of determination of whether the environmental level is the environmental level 1 or higher may be a short-term factor. Specifically, the determination of whether the environmental level in the process of step S202 is the environmental level 1 or higher may be a process of determining whether a short-term factor is removed and the environmental level is the environmental level 1 or higher. Since factors to be monitored are narrowed down by using a short-term factor as a target in this manner, the processing load of the automated driving control device 100 is reduced.

For example, it is assumed that the behavior plan generator 140 shunts the vehicle M since an accident has occurred ∘∘ meters ahead (a few hundred meters ahead). That is, since it corresponds to a predetermined condition, the vehicle M has been shunt. While the vehicle M is shunting, complex traffic congestion is assumed to have occurred due to the accident. The accident has been resolved a few minutes later, but traffic congestion continues. In this case, the predetermined condition is resolved, but traffic congestion is not resolved. Therefore, it may be assumed that a return condition for resuming the automated driving is not satisfied. In the above example, for example, a state in which the accident is resolved is a state in which the predetermined condition is resolved, and a state in which the accident and traffic congestion are resolved is a state in which the return condition is satisfied (the environmental level is higher than the environmental level during the shunt). In a case where the return condition is satisfied, the behavior plan generator 140 resumes the automated driving.

Figure 9:
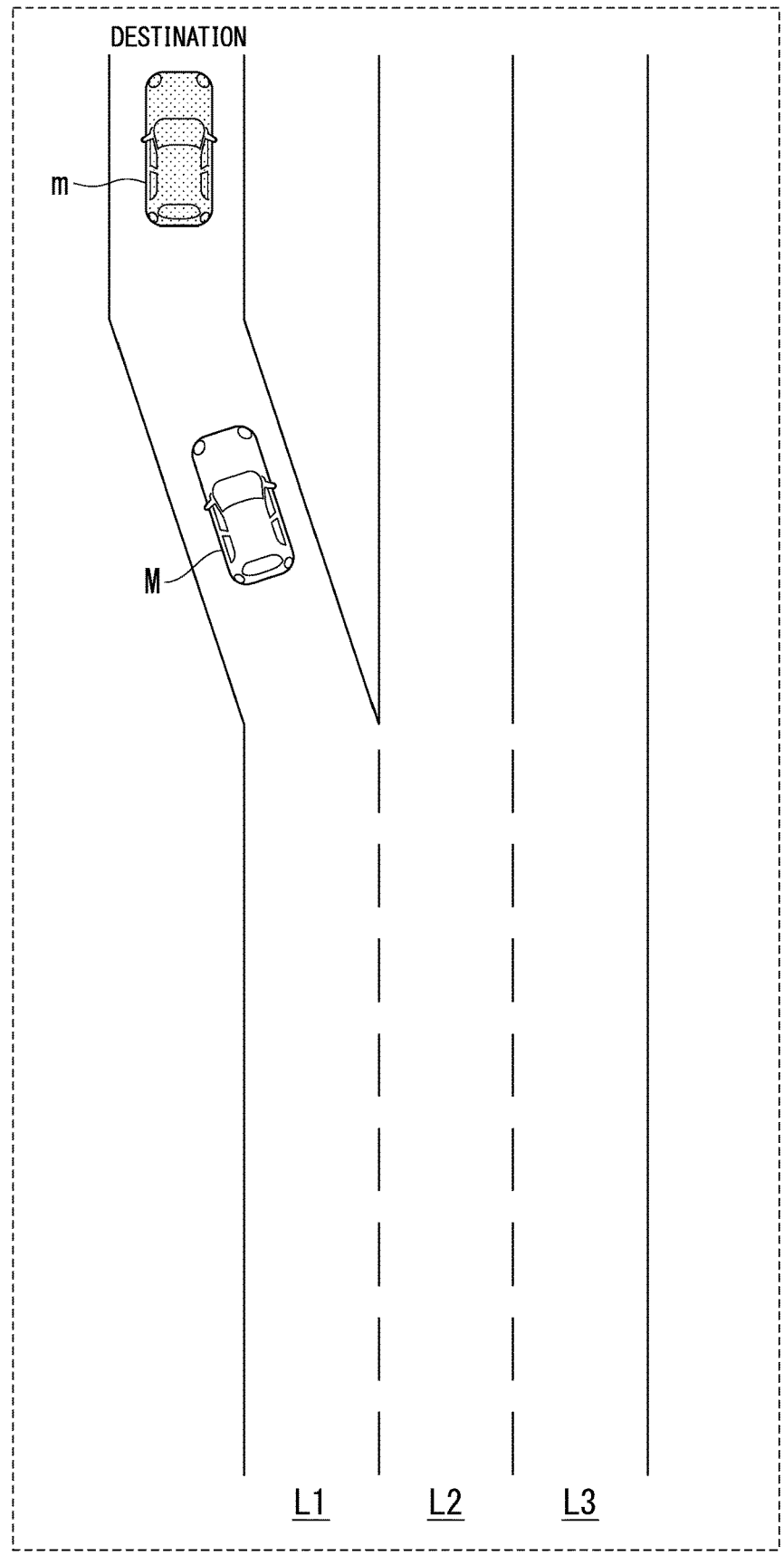
FIG. 9 is a diagram illustrating an example of a situation in which the vehicle resumes automated driving.

FIG. 9 is a diagram illustrating an example of a situation in which the vehicle M resumes the automated driving. A description will be given with focus on differences from the descriptions of FIGS. 6 and 7. In a case where the vehicle M stops, and then another vehicle m starts to travel, the environment recognizer 132 of the vehicle M recognizes that the environmental level is the environmental level 1 or higher. In this case, the vehicle M resumes the automated driving, and travels in the lane L1.

As described above, the behavior plan generator 140 resumes the automated driving in a case where the environmental level rises to the environmental level 1 or higher even when the environmental level drops to less than the environmental level 1 and the automated driving is stopped. Thereby, the behavior plan generator 140 can realize control of the vehicle according to environment. As a result, it is possible to improve a vehicle occupant's convenience.

Figure 10:
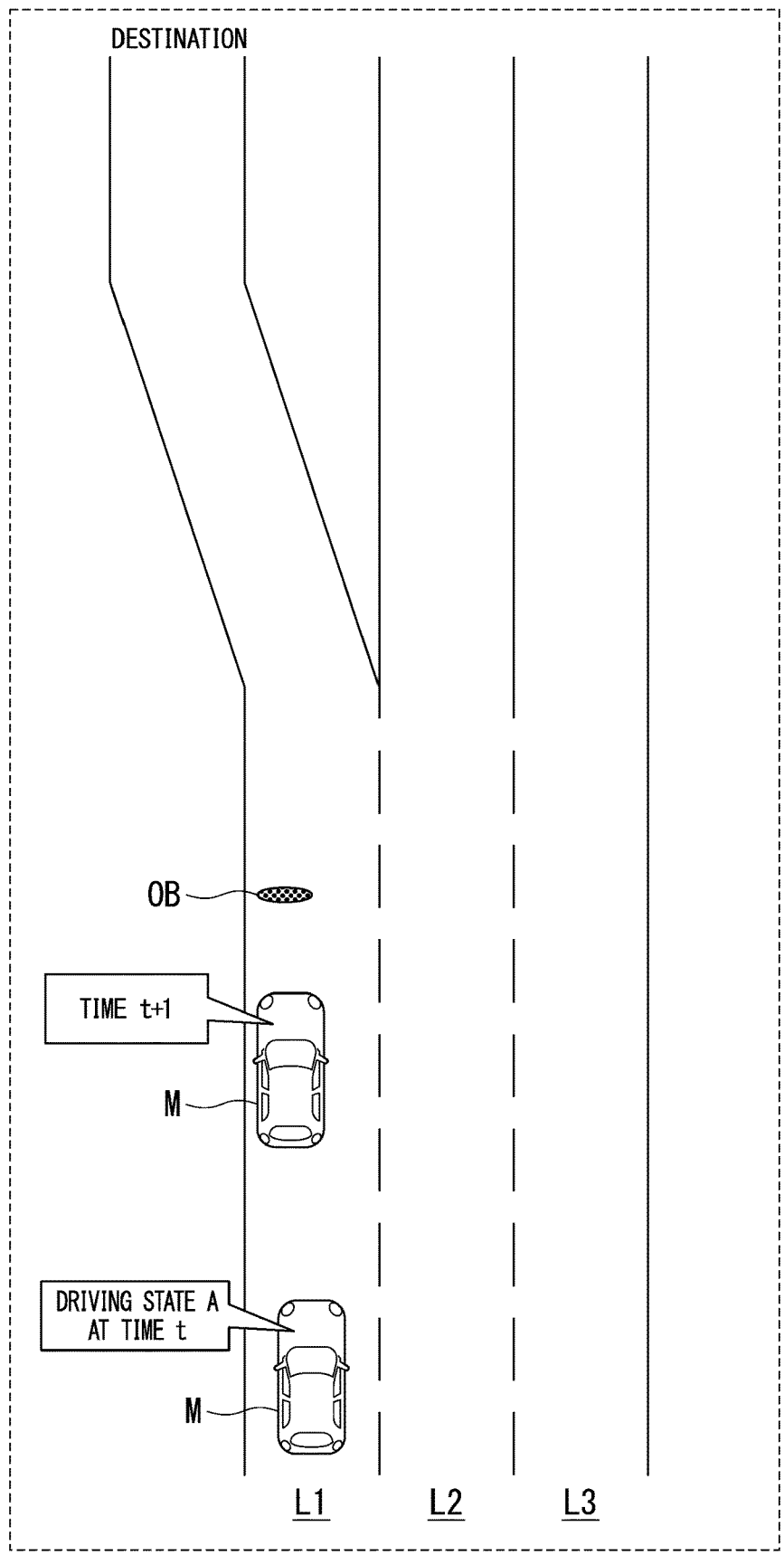
FIG. 10 is a first diagram illustrating another example of a situation in which the vehicle performs retraction control.

In the above example, although a case where the environment recognizer 132 recognizes that the environmental level decreases to less than the environmental level 1 due to another vehicle m which has stopped has been described, it may be recognized that the environmental level decreases to less than the environmental level 1 due to other events or objects. As shown in FIG. 10, in a case where a fallen object OB is present in the lane L1, the environment recognizer 132 may recognize that the environmental level is less than the environmental level 1. FIG. 10 is a first diagram illustrating another example of a situation in which the vehicle M performs the retraction control. The environment recognizer 132 may recognize that the environmental level is less than the environmental level 1 in a case where there are irregularities on a road, a case where an event estimated to influence the execution of the automated driving (for example the driving state A) occurs in the lane L1 or in the vicinity of the lane L1 such as a case where a white line cannot be recognized, or a case where an object estimated to influence the execution of the automated driving (for example, the driving state A) is present in the lane L1 or in the vicinity of the lane L1.

In the above example, although a case where the vehicle M travels in the lane L1 has been described, the above-described process may be performed even when the vehicle travels in a lane different from the lane L1 (for example, the lane L2 which is a main line).

Figure 11:
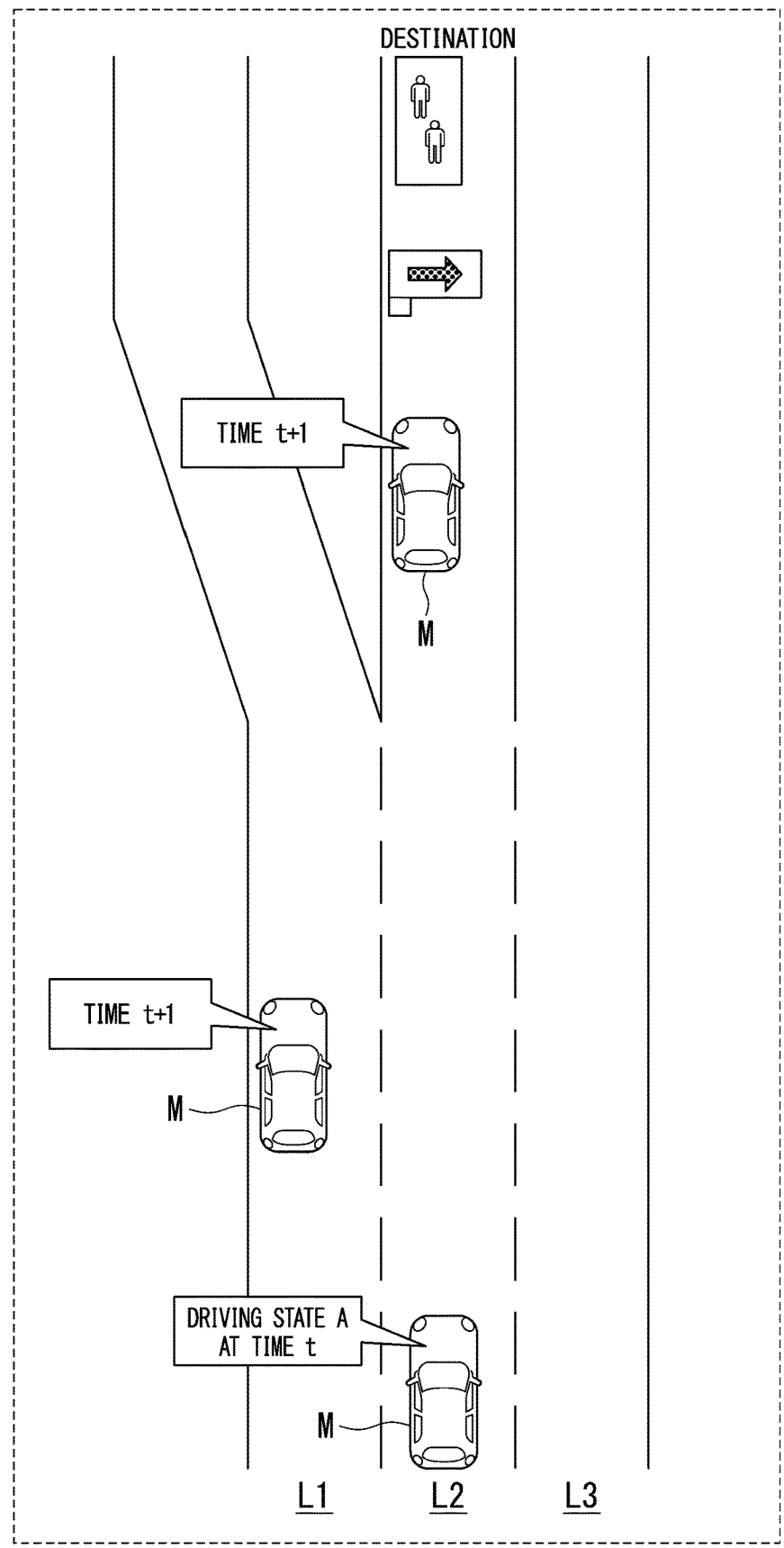
FIG. 11 is a second diagram illustrating another example of a situation in which the vehicle performs retraction control.

FIG. 11 is a second diagram illustrating another example of a situation in which the vehicle M performs the retraction control. In the example of FIG. 11, the vehicle M is assumed to travel in the lane L2 in the driving state A. At time t, the environment recognizer 132 recognizes that there is a signboard under construction in front of the vehicle M when the vehicle M is traveling in the lane L2. In this case, the environment recognizer 132 recognizes that the environmental level in the vicinity of the vehicle M is less than the environmental level 1. This is because an event (construction site) influencing the traveling of the vehicle M is present on the road (particularly, the lane L2).

In this manner, in a case where the environmental level is less than the environmental level 1, the vehicle M cannot continue to travel in the driving state A. In a case where the alternation of driving is not performed within a predetermined time from when it is recognized to be less than the environmental level 1, the retraction control is performed. At time t+1, the vehicle M is stopped at a predetermined shunt location. The shunt location is, for example, a position in front of a position at which a signboard under construction in the lane L2 is placed, the shoulder of the lane L1 or the lane L1, or the like.

According to the first embodiment described above, the automated driving control device 100 shunts the vehicle M to the shunt location to suspend the automated driving in accordance with a decrease in the environmental level, and resumes the automated driving in a case where, after the shunt, the environmental level rises to an environmental level higher than the environmental level during the shunt, whereby it is possible to realize control of the vehicle according to environment.

Second Embodiment

Hereinafter, a second embodiment will be described. In the first embodiment, a case where control of the vehicle M is changed on the basis of whether the environmental level is the threshold (for example, the environmental level 1) or higher, or less than the threshold has been described. In the second embodiment, the environmental level is recognized in a stepwise manner, and control of the vehicle M is changed on the basis of this environmental level. Hereinafter, differences from the first embodiment will be described.

In the second embodiment, content of executable automated driving differs for each environmental level. FIG. 12 is a diagram illustrating a relationship among an environmental level, content of executable automated driving, and a situation in the vicinity of a road. For example, automated driving in the driving state A can be executed in the environmental level 1, automated driving in the driving state B can be executed in the environmental level 2, and automated driving in the driving state C can be executed in the environmental level 3.

In the environment, the number of objects or events to be obstructed when the vehicle travels or the number of objects to be recognized is small in the order of the environmental levels 1, 2, and 3. The environment recognizer 132 recognizes that the environmental level is the environmental level 2, for example, in a case where there are recessed portions or protruding portions having a predetermined size or less, or in the case of a rainfall or a snowfall of ○○ or less. The environment recognizer 132 recognizes that the environmental level is the environmental level 3 (or less than the environmental level 3), for example, in the case of construction, a stop vehicle, or a rainfall or a snowfall of xx or more.

Figure 13:
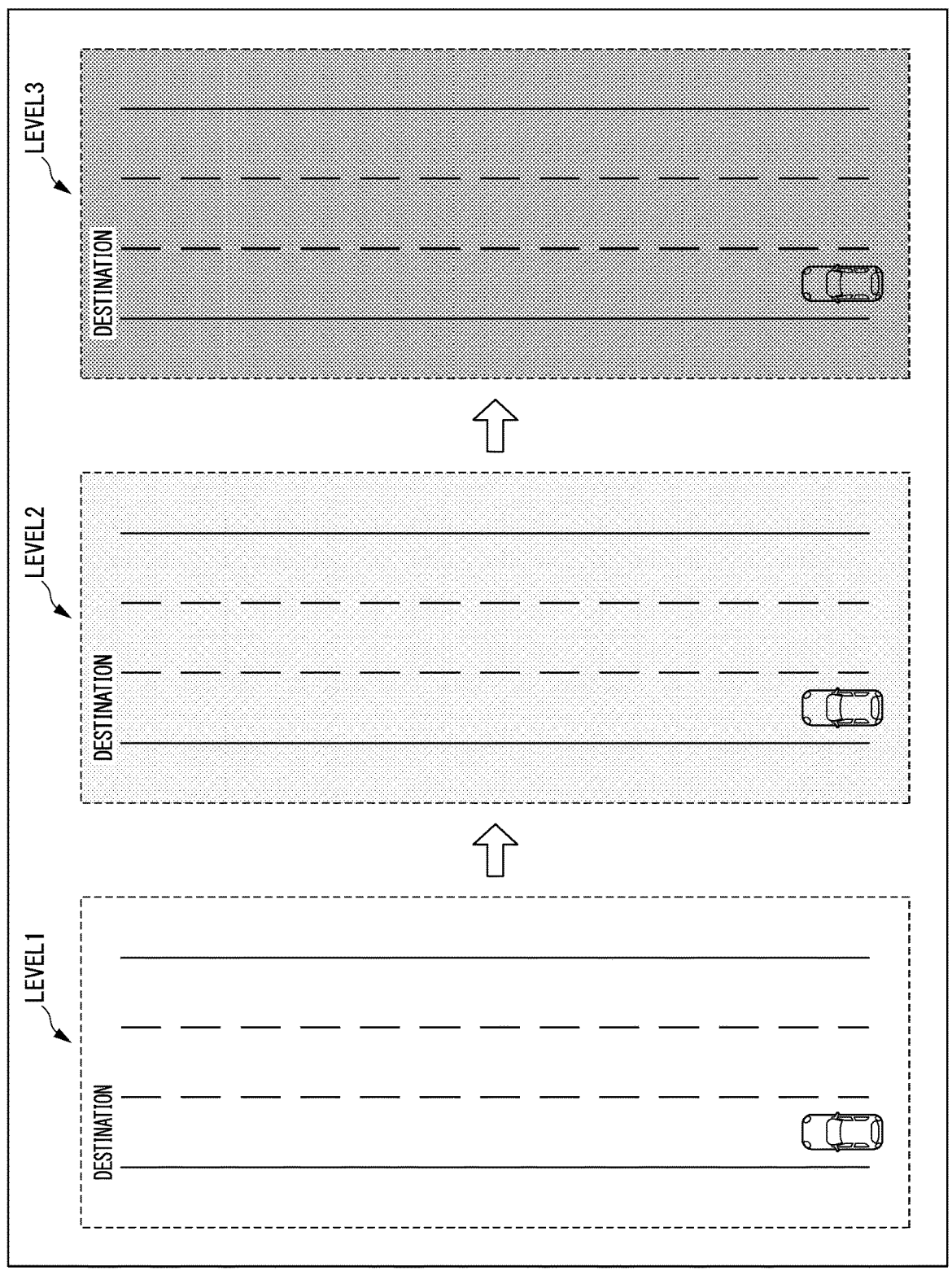
FIG. 13 is a diagram illustrating environmental levels.

FIG. 13 is a diagram illustrating environmental levels. The example of FIG. 13 shows a change in the environmental level in a case where snow (or rain) or the like falls on a road from the sky. For example, in a state where it is not snowing, the environment recognizer 132 recognizes the environment of the road to be at the environmental level 1. For example, in a state where a first predetermined time has elapsed since snow began to fall, and the road is covered with approximately a few millimeters of snow, the environment recognizer 132 recognizes the environment of the road to be at the environmental level 2. For example, in a case where a second predetermined time (>the first predetermined time) has elapsed since snow began to fall, and the road is covered with approximately a few tens of centimeters of snow, the environment recognizer 132 recognizes the environment of the road to be at the environmental level 3.

Depending on the environment of the road, the environment recognizer 132 may recognize the environment of the road to be at the environmental level 1 and then recognize the environment of the road to be at the environmental level 3 without going through the environmental level 2, or may recognize the environment of the road to be at the environmental level 3 and then recognize the environment of the road to be at the environmental level 1 without going through the environmental level 2.

Figure 14:
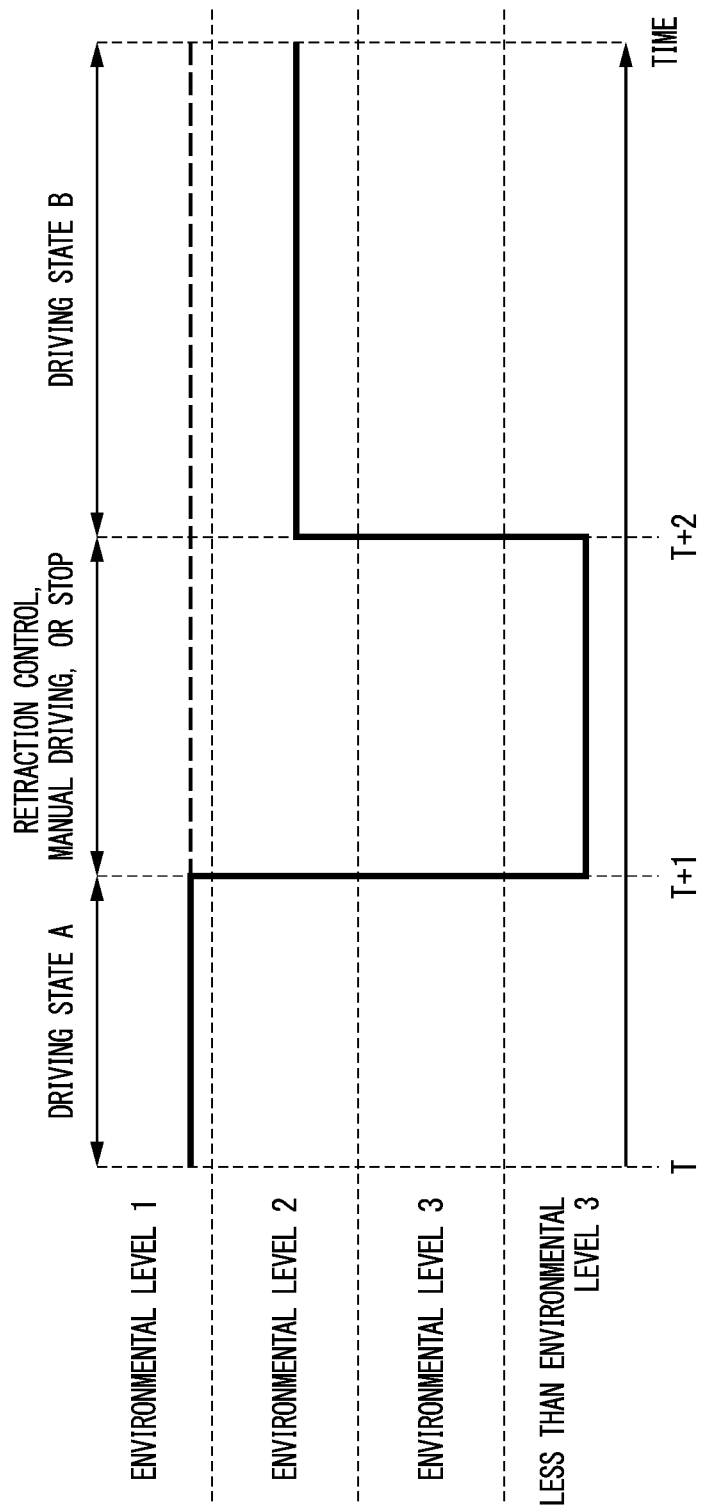
FIG. 14 is a diagram illustrating an outline of a process which is executed by an automated driving control device of a second embodiment.

FIG. 14 is a diagram illustrating an outline of a process which is executed by the automated driving control device 100 of the second embodiment. The horizontal axis of FIG. 14 represents time, and the vertical axis of FIG. 14 represents an environmental level. For example, the behavior plan generator 140 refers to the information table 192, and is assumed to decide that the driving state A is executed because a section from a departure point to a destination is a section of the environmental level 1 or higher. For example, in a case where the driving state A is executed at time T, and it is recognized to be less than the environmental level 3 at time T+1, the behavior plan generator 140 executes the retraction control. In a case where, at time T+2, the environmental level rises to the environmental level 2 and a condition for executing the driving state B is satisfied, the automated driving is resumed in the driving state B. That is, the behavior plan generator 140 shunts the vehicle to the shunt location to suspend the automated driving after the environmental level drops, and resumes the automated driving in a driving state according to the environmental level in a case where, after the shunt, the environmental level rises to an environmental level higher than the environmental level during the shunt.

Figure 15:
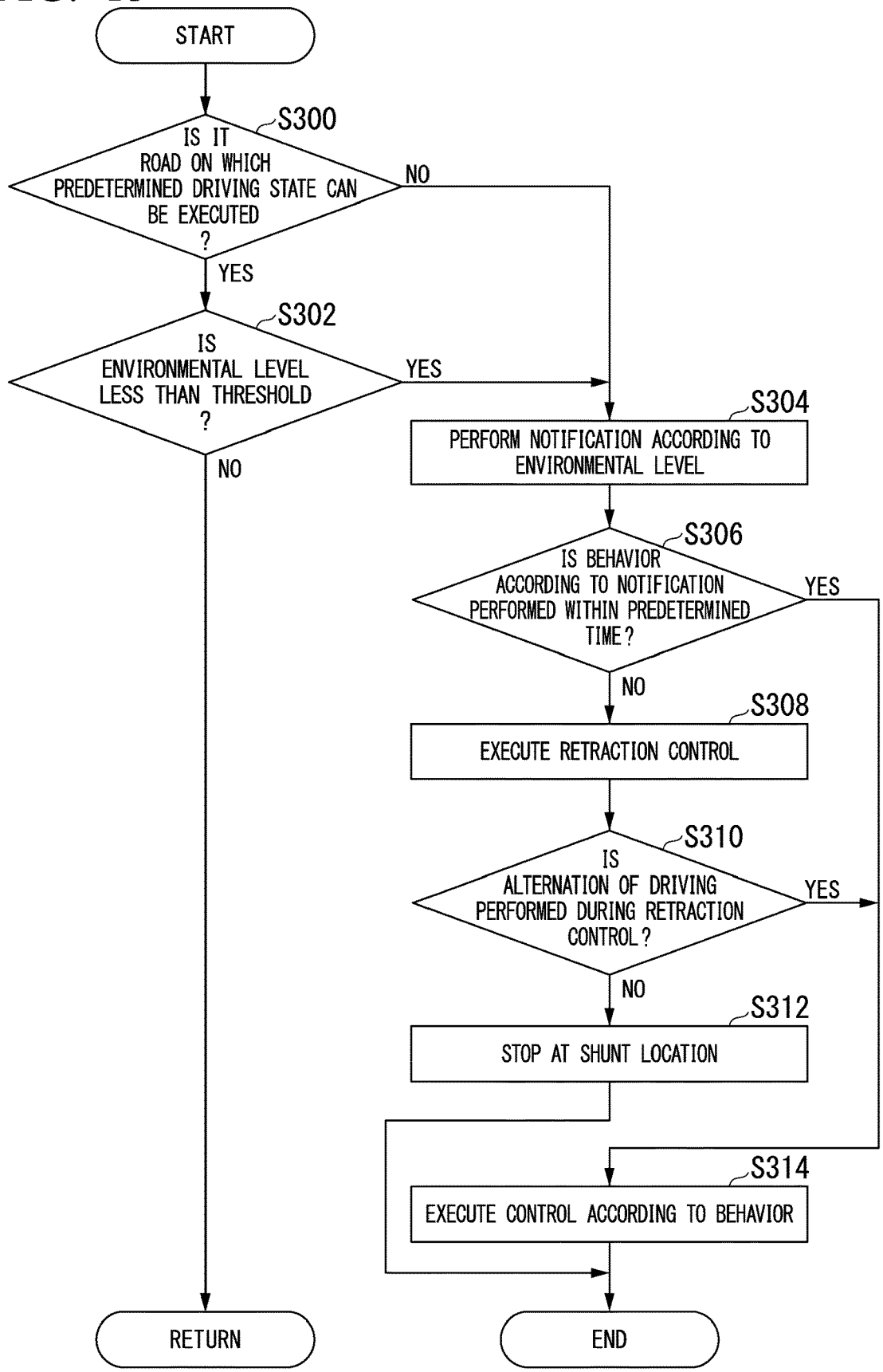
FIG. 15 is a first flow chart illustrating an example of a flow of processes which are executed by the automated driving control device of the second embodiment.

FIG. 15 is a first flow chart illustrating an example of a flow of processes which are executed by the automated driving control device 100 of the second embodiment. First, the behavior plan generator 140 refers to the information table 192, and determines whether being a road on which a predetermined driving state can be executed (step S300). In a case where it is determined that the road on which the vehicle M is traveling is a road on which the driving state A can be executed, the behavior plan generator 140 determines whether the environmental level is less than a threshold (step S302). The term "predetermined driving state" refers to, for example, a driving state executed in processing before one routine. The term "threshold" refers to a threshold which is set between the predetermined driving state and another driving state having the degree of automated driving lower than the predetermined driving state. For example, in a state where the automated driving is performed in the driving state A, the threshold is a threshold which is set between the driving state A and the driving state B, and in a state where the automated driving is performed in the driving state B, the threshold is a threshold which is set between the driving state B and the driving state C. In a case where it is determined that the environmental level is not less than the threshold (is the threshold or higher), processing of one routine of the present flow chart is finished.

In a case where it is determined that the road on which the vehicle M is traveling is not a road on which the predetermined driving state can be executed, or a case where the environmental level is less than the threshold, the output controller 180 performs a notification according to an environmental level recognized by the environment recognizer 132 (step S304).

(1) For example, in the case of a change from the environmental level 1 to the environmental level 2, the output controller 180 performs a notification for requesting an occupant to monitor the vicinity.

(2) For example, in the case of a change from the environmental level 2 to the environmental level 3, the output controller 180 performs a notification for requesting the occupant to grasp the steering wheel, in addition to the notification for requesting the occupant to monitor the vicinity.

(3) For example, in the case of a change from the environmental level 3 to an environmental level less than the environmental level 3, the output controller 180 performs a notification for requesting the occupant to perform manual driving.

(4) For example, in the case of a change from the environmental level 1 to the environmental level 3, the output controller 180 requests the occupant to monitor the vicinity, and performs a notification for requesting the occupant to grasp the steering wheel.

Next, the behavior plan generator 140 determines whether a behavior according to a notification of step S304 is performed within a predetermined time (step S306). In a case where the behavior according to a notification of step S304 (predetermined behavior) is performed within a predetermined time, the flow proceeds to the process of step S314. For example, in a case where a notification of the above (1) is performed, and the occupant monitors the vicinity, the vehicle M executes the automated driving in the driving state B. For example, in a case where a notification of the above (2) is performed, and the occupant monitors the vicinity and grasps the steering wheel, the vehicle M executes the automated driving in the driving state C. For example, in a case where a notification of the above (3) is performed, and the occupant starts the manual driving, the vehicle M executes the automated driving in the driving state C.

In a case where the behavior according to a notification of step S304 is not performed within a predetermined time, the behavior plan generator 140 executes the retraction control (step S308). Next, the behavior plan generator 140 determines whether the alternation of driving is performed during the retraction control (step S310). In a case where the alternation of driving is not performed during the retraction control, the behavior plan generator 140 stops the vehicle M at a shunt location (step S312). In a case where the alternation of driving is performed during the retraction control, or a case where the alternation of driving is performed in step S306 within a predetermined time, the behavior plan generator 140 executes control based on a driver's driving (step S314). That is, the occupant controls the vehicle M by manual driving. This concludes the process of the present flow chart.

In step S310, the following determination may be performed. For example, the behavior plan generator 140 determines whether a behavior according to the environmental level recognized by the environment recognizer 132 is performed, and in a case where the behavior according to the environmental level is performed, executable automated driving may be performed in the behavior performed in the process of step S314. For example, when the occupant monitors the vicinity and grasps the steering wheel in the case of the environmental level 2, the vehicle M may execute the automated driving in the driving state C.

Through the above-described process, even in a case where the environmental level decreases, the behavior plan generator 140 can realize control of the vehicle according to the environment of the environmental level.

Figure 16:
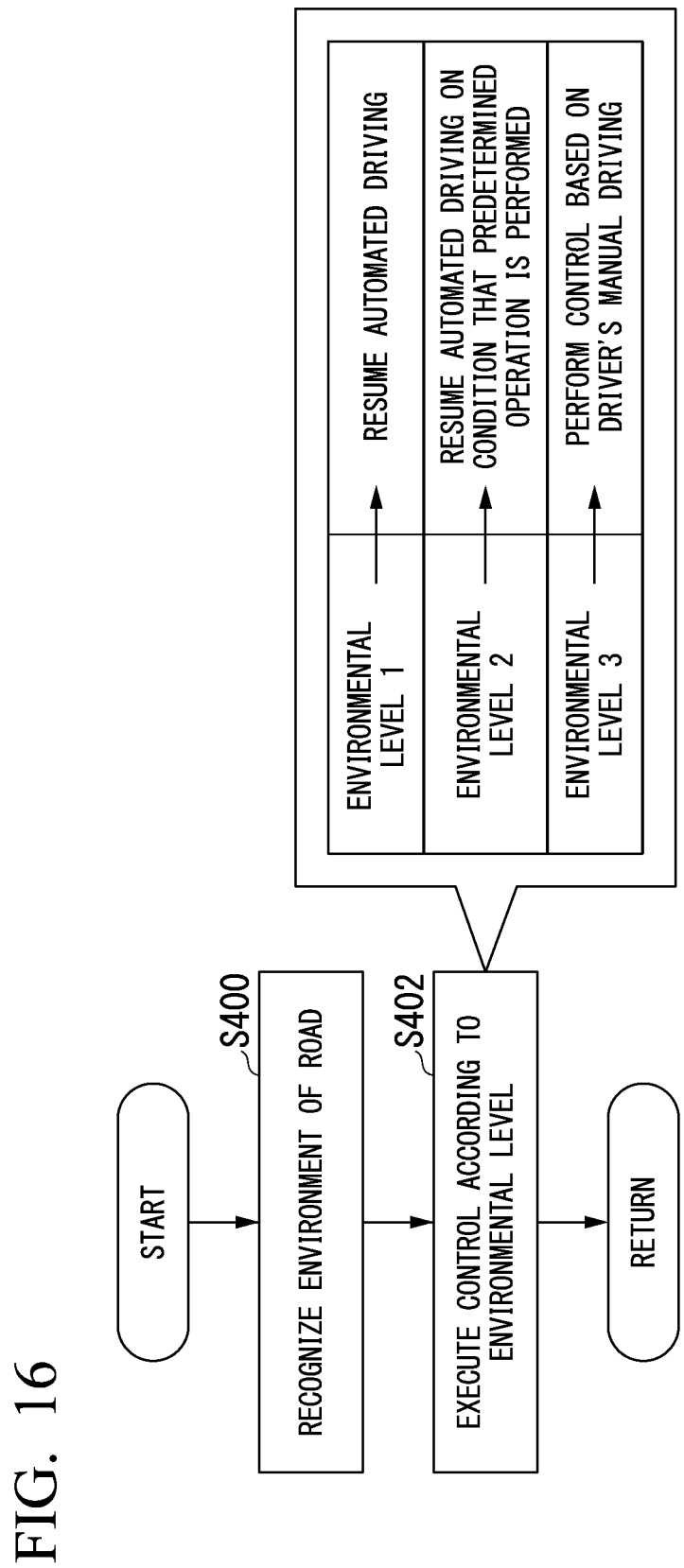
FIG. 16 is a second flow chart illustrating an example of a flow of processes which are executed by the automated driving control device of the second embodiment.

FIG. 16 is a second flow chart illustrating an example of a flow of processes which are executed by the automated driving control device 100 of the second embodiment. This process is a process which is executed after the vehicle M stops the retraction control. First, the environment recognizer 132 recognizes the environment of a road (step S400). Next, the behavior plan generator 140 executes control according to the environmental level recognized by the environment recognizer 132 (step S402). The output controller 180 outputs a condition for executing the automated driving mode executed before the shunt to the HMI 30. In a case where a condition for resuming the automated driving executed before the shunt is satisfied, the behavior plan generator 140 performs the automated driving in the automated driving mode executed before the shunt. This concludes the process of the present flow chart.

For example, in the case of rise to the environmental level 1, the behavior plan generator 140 automatically resumes the automated driving in the driving state A. In this case, the behavior plan generator 140 controls the vehicle M on the basis of the recognition result of the recognizer 130. For example, the behavior plan generator 140 starts the vehicle M at a timing when there is no other vehicle traveling in the vicinity of the vehicle M.

For example, in the case of rise to the environmental level 2, the behavior plan generator 140 resumes the automated driving in the driving state B on the condition that a first behavior is performed by the occupant. The first behavior involves, for example, the occupant monitoring the vicinity of the vehicle M, a predetermined button of the HMI 30 being operated, a predetermined gesture being performed, or a predetermined speech being performed. The first behavior may involve a predetermined button being operated in addition to the occupant monitoring the vicinity of the vehicle M.

For example, in the case of rise to the environmental level 3, the vehicle M starts to travel on the basis of the manual driving without resuming the automated driving. In this manner, in the case of rise to an environmental level higher than a predetermined level, automated driving according to the environmental level is resumed.

For example, in a case where control according to an environmental level is executed (a case where the automated driving is resumed) as described above, the output controller 180 refers to information relating to the automated driving mode executed before the shunt which is stored in the storage 190, and outputs the condition for executing the automated driving mode executed before the shunt to the HMI 30.

Instead of the above-described process, the environment recognizer 132 may classify environmental levels into four or more stages such as environmental levels a, b, c, and d, or the like. In this case, for example, in the case of the environmental level a, the behavior plan generator 140 automatically resumes the automated driving in the driving state A. In the case of the environmental level b, the behavior plan generator 140 automatically resumes the automated driving in the driving state B when the first behavior is performed. In the case of the environmental level c, the behavior plan generator 140 automatically resumes the automated driving in the driving state C when a second behavior is performed. The second behavior is a behavior having a greater task imposed on the occupant than the first behavior. The second behavior involves, for example, the occupant grasping the steering wheel in addition to the occupant monitoring the vicinity of the vehicle M. In the case of the environmental level d, the vehicle M starts to travel on the basis of the manual driving without resuming the automated driving.

Figure 17:
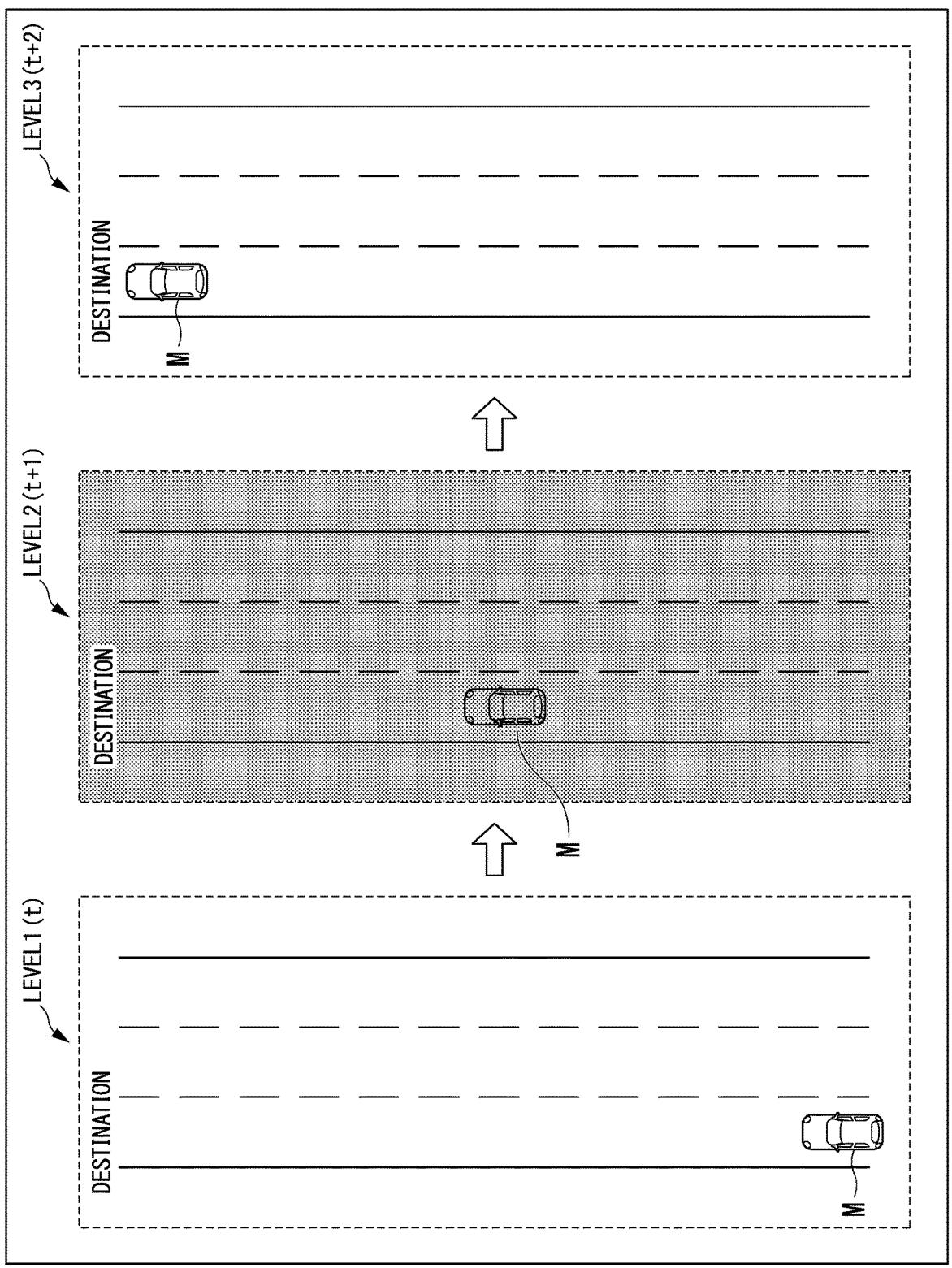
FIG. 17 is a diagram illustrating an example of a situation in which a vehicle of the second embodiment resumes automated driving.

FIG. 17 is a diagram illustrating an example of a situation in which the vehicle M of the second embodiment resumes the automated driving. At time t, the environmental level is assumed to be the environmental level 1. In this case, the vehicle M is traveling by performing the automated driving in the driving state A. At time t+1, it is assumed that, for example, heavy rain or the like falls and the environmental level is the environmental level 3. In this case, the vehicle M stops by performing the retraction control. At time t+2, heavy rain stops and the environmental level returns to the environmental level 1. In this case, the vehicle M starts to travel by performing the automated driving in the driving state A.

As described above, even in a case where there is a change in the environmental level due to a disturbance such as the weather, the automated driving control device 100 can execute control according to the environmental level.

According to the second embodiment described above, in a case where the environmental level drops and then rises to a predetermined environmental level, the automated driving control device 100 executes control according to the rising environmental level. As a result, the same effect as that of first embodiment is exhibited.

Third Embodiment

Hereinafter, a third embodiment will be described. In the third embodiment, in a case where, after the vehicle M is shunted, there is no region in which the environmental level is less than a threshold (a region having a decrease in the environmental level) in a predetermined range in the traveling direction of the vehicle M, the automated driving is resumed. Hereinafter, differences from the first embodiment will be described.

Figure 18:
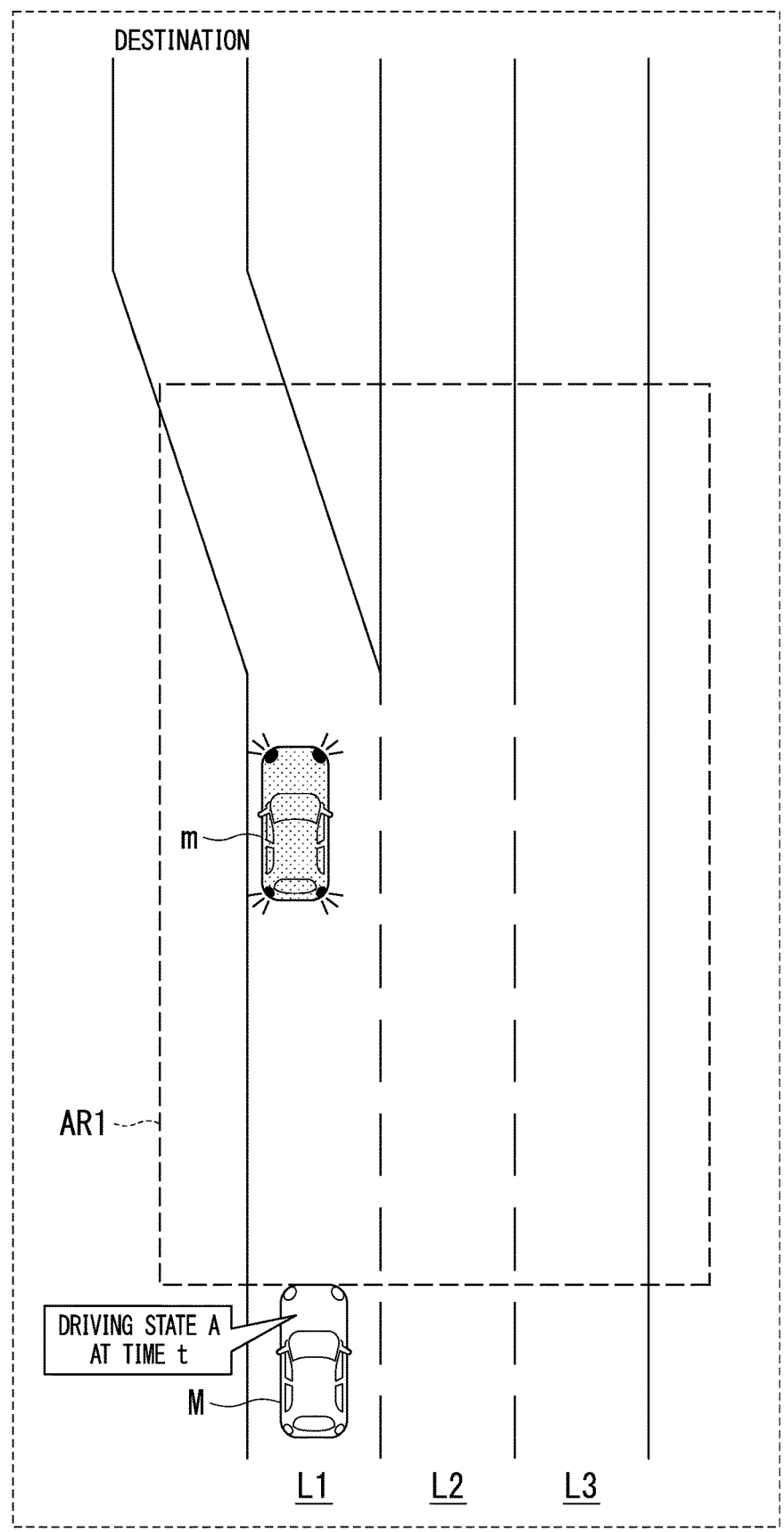
FIG. 18 is a diagram illustrating a process of shunting the vehicle to a shunt location to suspend automated driving in a case where an environmental level changes to less than a threshold in a first region.

The behavior plan generator 140 shunts the vehicle to a shunt location to suspend the automated driving in a case where the environmental level changes to less than the threshold in a first region AR1 shown in FIG. 18. The environment recognizer 132 recognizes whether the environmental level of the first region AR1 is less than a first level on the basis of the recognition result of the object recognition device 16 (detector) provided in the vehicle M.

Figure 19:
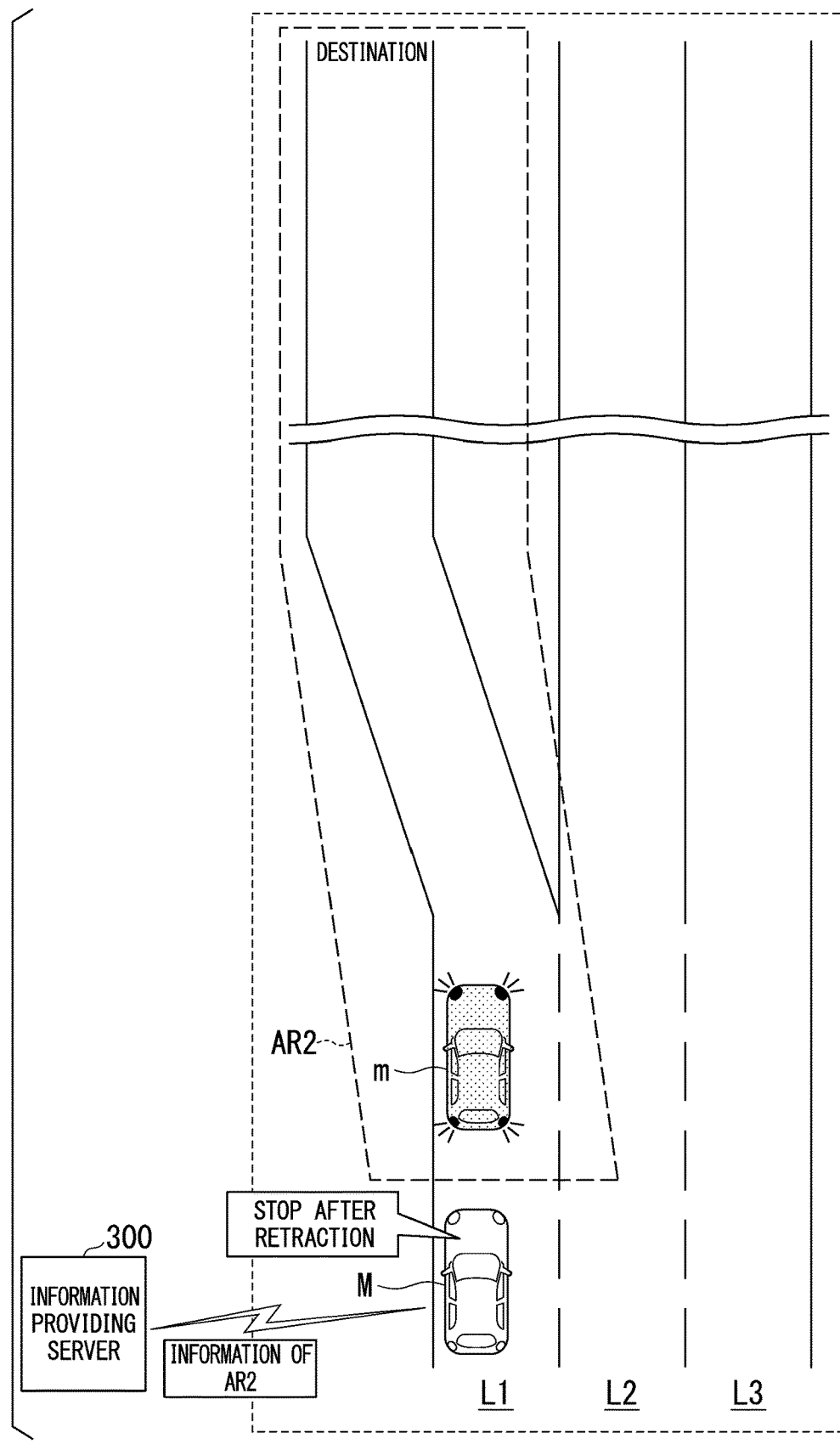
FIG. 19 is a diagram illustrating a process of resuming automated driving after shunt in a case where a region in which the environmental level is less than the threshold is not present in a second region.

The behavior plan generator 140 resumes the automated driving after the shunt in a case where there is no region in which the environmental level is less than the threshold in a second region AR2 shown in FIG. 19. The second region AR2 is a region larger than the first region AR1. For example, the second region AR2 is a range of a few (2 to 3) km in a direction in which the vehicle M travels. For example, the first region AR1 is a range of a few hundred (200 to 300) m in a direction in which the vehicle M travels or in the vicinity of the vehicle. The environment recognizer 132 recognizes the presence or absence of a region in which the environmental level of the second region AR2 is less than the first level on the basis of information provided and acquired by an information providing server 300 (information processing device) as shown in FIG. 19. The first region AR1 or the second region AR2 may have various shapes such as a circle, a semicircle, or a shape close to a rectangle as shown in the drawing. The first region AR1 is an example of a "first region including the vehicle," and the second region AR2 is an example of a "second region including the vehicle." The predetermined range is a predetermined region centering on the vehicle M. The predetermined region may have, for example, a circular shape or an elliptical shape. The elliptical shape may be, for example, a shape in which the front region of the ellipse extends out longer than the rear region thereof. The region of a predetermined distance is a region including a range of a distance extending along a scheduled traveling route of the host vehicle M.

In this manner, in a case where there is no region in which the environmental level is less than the threshold in the second region AR2, the automated driving is resumed by resuming the automated driving, and then immediate suspension of the automated driving due to a decrease in the environmental level is suppressed.

According to the third embodiment described above, the automated driving control device 100 resumes the automated driving in a case where it is estimated that the automated driving can be continued for a predetermined distance or more when the vehicle M resumes the automated driving. As a result, the occupant's convenience is improved.

[Hardware Configuration]

Figure 20:
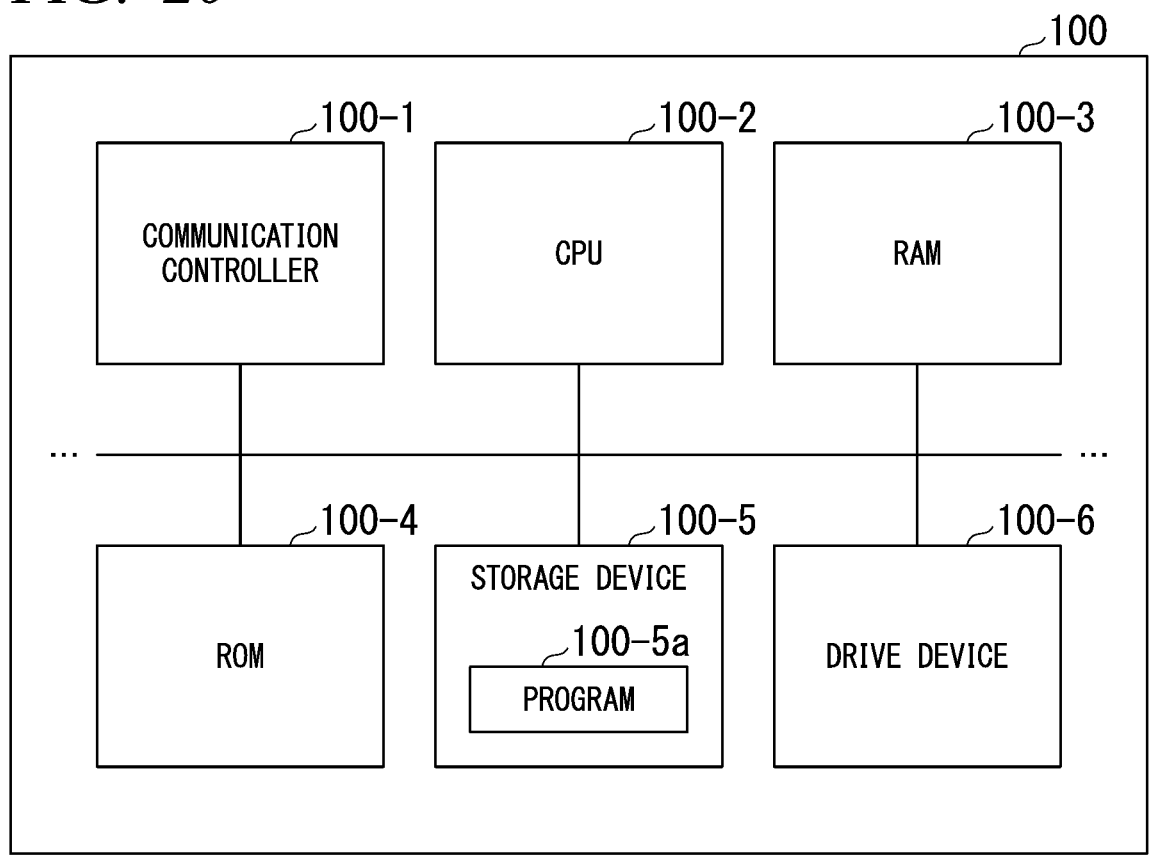
FIG. 20 is a diagram illustrating an example of a hardware configuration of the automated driving control device.

FIG. 20 is a diagram illustrating an example of a hardware configuration of the automated driving control device 100. As shown in the drawing, the automated driving control device 100 is configured such that a communication controller 100-1, a CPU 100-2, a random access memory (RAM) 100-3 used as a working memory, a read only memory (ROM) 100-4 that stores a boot program or the like, a storage device 100-5 such as a flash memory or a hard disk drive (HDD), a drive device 100-6, and the like are connected to each other through an internal bus or a dedicated communication line. The communication controller 100-1 performs communication with components other than the automated driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the recognizer 130, the behavior plan generator 140, and the second controller 160 are realized.

The above-described embodiment can be represented as follows.

A vehicle control device including:
a storage device having a program stored therein; and
a hardware processor,
wherein the hardware processor executes the program stored in the storage device, to thereby
recognize a peripheral situation of a vehicle,
execute automated driving for controlling a speed and steering of the vehicle on the basis of the recognition result,
recognize a real-time environment including a situation of a nearby vehicle or a situation of a nearby road on which the vehicle travels;
shunt the vehicle to a shunt location to suspend the automated driving in a case where the real-time environment corresponds to a predetermined condition, and
resume the automated driving in a case where it is recognized that the predetermined condition is resolved after the shunt.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer that is configured to recognize a peripheral situation of a vehicle and an environmental level indicating a real-time environment including a situation of a nearby vehicle or a situation of a nearby road on which the vehicle travels; and
a driving controller that is configured to execute an automated driving mode and execute automated driving for controlling a speed and steering of the vehicle on the basis of a recognition result of the recognizer in the automated driving mode,
wherein
the driving controller is configured to shunt the vehicle to a shunt location to suspend the automated driving in a case where the real-time environment corresponds to a predetermined condition in accordance with a decrease in the environmental level, and resume the automated driving in a case where, after the shunt, the environmental level including the predetermined condition being resolved rises to an environmental level higher than the environmental level during the shunt, wherein the driving controller is configured to:

shunt the vehicle to a shunt location to suspend the automated driving in accordance with a decrease in the environmental level due to a first factor among predetermined factors, and then transition to a preparation mode for reducing electric power of a monitoring device that monitors the vicinity of the vehicle mounted in the vehicle, shunt the vehicle to a shunt location to suspend the automated driving in accordance with a decrease in the environmental level due to a second factor estimated to take a longer time to be removed than the first factor among predetermined factors, and then transition to a power saving mode for reducing electric power of the monitoring device more than in the preparation mode, an electric power consumption of the monitoring device in a case in which the vehicle stops in the automated driving mode is higher than an electric power consumption of the monitoring device in a case in which the vehicle stops in the preparation mode or the power saving mode, and an electric power consumption of the monitoring device in a case in which the vehicle stops in the power saving mode is lower than an electric power consumption of the monitoring device in a case in which the vehicle stops in the preparation mode.

2. The vehicle control device according to claim 1, wherein the environmental level decreases due to a predetermined factor, and the factor is construction being performed on a road, the presence of a vehicle stopped on a road in an emergency, an emergency vehicle approaching the vehicle, or a road partition line used as a reference when automated driving is executed not being recognized by the vehicle.

3. The vehicle control device according to claim 2, wherein the driving controller is configured to shunt the vehicle to a shunt location to suspend the automated driving, and then resume the automated driving in a case where the factor is removed and the environmental level rises to an environmental level higher than a predetermined level.

4. The vehicle control device according to claim 1, wherein the driving controller is configured to shunt the vehicle to a shunt location to suspend the automated driving in a case where the environmental level decreases, and an occupant does not perform a predetermined behavior.

5. The vehicle control device according to claim 4, wherein the predetermined behavior involves the occupant performing manual driving, the occupant monitoring a vicinity, or the occupant monitoring a vicinity and grasping a steering wheel.

6. The vehicle control device according to claim 1, wherein the driving controller is configured to shunt the vehicle to a shunt location to suspend the automated driving in a case of entering a road on which a first automated driving mode is not able to be executed from a road on which automated driving of the first automated driving mode is able to be executed in map information, and then move the vehicle in a case where it is recognized that a shunt location is required to be changed on the basis of a result of a detector while maintaining a state in which the detector mounted in the vehicle is started up.

7. The vehicle control device according to claim 1, further comprising an output controller that, in a case where the automated driving is resumed, refers to information relating to an automated driving mode executed before the shunt which is stored in a storage, and is configured to cause an output device to output a condition for executing the automated driving mode executed before the shunt, wherein the driving controller is configured to cause the storage to store the automated driving mode executed before the shunt in a case where the vehicle is shunted to a shunt location, and perform automated driving in the automated driving mode executed before the shunt in a case where the condition is satisfied.

8. The vehicle control device according to claim 1, the first factor is that a vehicle stopped on a road in an emergency is present, an emergency vehicle approaching the vehicle, or a road partition line used as a reference when automated driving is executed is not being recognized by the vehicle, and the second factor is that the vehicle does not have map information to be referred to during the automated driving or an area in which the degree of difficulty of passing through by the automated driving being a predetermined value or more is present.

9. The vehicle control device according to claim 1, wherein the monitoring device includes at least one of a camera, a radar device, or a viewfinder.

10. The vehicle control device according to claim 9, the driving controller is configured to shunt the vehicle to a shunt location to suspend the automated driving in a case where a road partition line used as a reference when automated driving is executed is not being recognized by the monitoring device, and selecting an automated driving mode from among a plurality of automated driving modes in accordance with degree a recognition result of the road partition by the monitoring device when the road partition line being recognized by the monitoring device, then resume the automated driving in the selected automated driving mode.

11. A vehicle control device comprising:

a recognizer that is configured to recognize a peripheral situation of a vehicle and an environmental level indicating a real-time environment including a situation of a nearby vehicle or a situation of a nearby road on which the vehicle travels; and a driving controller that is configured to execute an automated driving mode and execute automated driving for controlling a speed and steering of the vehicle on the basis of a recognition result of the recognizer in the automated driving mode, wherein the driving controller is configured to shunt the vehicle to a shunt location to suspend the automated driving in a case where the environmental level corresponds to a predetermined condition in accordance with a decrease in the environmental level, and resume the automated driving in a case where, after the shunt, the environmental level including the predetermined condition being resolved rises to an environmental level higher than the environmental level during the shunt, wherein the driving controller is configured to shunt the vehicle to a shunt location to suspend the automated driving in a case where the environmental level decreases in a first region including the vehicle, and resume the automated driving after the shunt in a case where a region of the decreased environmental level and a region of the environmental level that is lower than the decreased environmental level is not present in a second region including the vehicle, and the first region is a region smaller than the second region.

12. The vehicle control device according to claim 11, wherein the recognizer is configured to recognize the environmental level of the first region on the basis of a recognition result of a detector provided in a vehicle, and is configured to recognize the environmental level of the second region on the basis of information acquired from an information processing device provided outside the vehicle for providing information.

13. The vehicle control device according to claim 11, wherein the driving controller is configured to shunt the vehicle to a shunt location to suspend the automated driving in a case where the environmental level decreases in a first region including the vehicle, and continue to suspend the automated driving in a case where a region of the decrease environmental level or the region of the environmental that is lower than the decreased environmental is present in a second region including the vehicle.

14. A vehicle control method comprising causing a computer to:

recognize, as a recognition result, a peripheral situation of a vehicle and an environmental level indicating a real-time environment including a situation of a nearby vehicle or a situation of a nearby road on which the vehicle travels; and execute automated driving for controlling a speed and steering of the vehicle on the basis of the recognition result;

shunt the vehicle to a shunt location to suspend the automated driving in a case where the real-time environment corresponds to a predetermined condition in accordance with a decrease in the environmental level; and resume the automated driving in a case where, after the shunt, the environmental level including the predetermined condition being resolved rises to environmental level higher than the environmental level during the shunt;

shunt the vehicle to a shunt location to suspend the automated driving in accordance with a decrease in the environmental level due to a first factor among predetermined factors, and then transition to a preparation mode for reducing electric power of a monitoring device that monitors the vicinity of the vehicle mounted in the vehicle;

shunt the vehicle to a shunt location to suspend the automated driving in accordance with a decrease in the environmental level due to a second factor estimated to take a longer time to be removed than the first factor among predetermined factors, and then transition to a power saving mode for reducing electric power of the monitoring device more than in the preparation mode;

wherein an electric power consumption of the monitoring device in a case in which the vehicle stops in the automated driving mode is higher than an electric power consumption of the monitoring device in a case in which the vehicle stops in the preparation mode or the power saving mode, and wherein an electric power consumption of the monitoring device in a case in which the vehicle stops in the power saving mode is lower than an electric power consumption of the monitoring device in a case in which the vehicle stops in the preparation mode.

* * * * *